(12) United States Patent
Kugimachi

(10) Patent No.: US 12,355,928 B2
(45) Date of Patent: Jul. 8, 2025

(54) READING DEVICE AND CONTROL METHOD WITH NOTIFICATION OF AN ERROR OR IMPROVEMENT ASSOCIATED WITH DOCUMENT TRANSPORT AND DATA TRANSFER SPEED

(71) Applicant: SEIKO EPSON CORPORATION, Tokyo (JP)

(72) Inventor: Hisataka Kugimachi, Fukutsu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/458,004

(22) Filed: Aug. 29, 2023

(65) Prior Publication Data
US 2024/0073336 A1  Feb. 29, 2024

(30) Foreign Application Priority Data

Aug. 30, 2022 (JP) .................................. 2022-137257
Aug. 30, 2022 (JP) .................................. 2022-137258

(51) Int. Cl.
*H04N 1/00* (2006.01)
*H04N 1/333* (2006.01)

(52) U.S. Cl.
CPC ..... *H04N 1/00652* (2013.01); *H04N 1/00225* (2013.01); *H04N 1/00663* (2013.01);
(Continued)

(58) Field of Classification Search
CPC .......... H04N 1/00225; H04N 1/00477; H04N 1/00652; H04N 1/00663; H04N 1/00824;
(Continued)

(56) References Cited

U.S. PATENT DOCUMENTS 6,223,221 B1 * 4/2001 Kunz ...................... H04L 43/50
709/224
7,202,981 B2 * 4/2007 Wang ................. H04N 1/00241
358/468

(Continued)

FOREIGN PATENT DOCUMENTS

JP H11-215326 A 8/1999
JP 2004-201229 A 7/2004
(Continued)

*Primary Examiner* — Scott A Rogers
(74) *Attorney, Agent, or Firm* — WORKMAN NYDEGGER

(57) ABSTRACT

A reading device connected to an external device include a transport section configured to transport a document, a reading section configured to read the document transported by the transport section, a data generation section configured to generate image data of the document read by the reading section; a transfer section configured to transfer the image data to the external device, a notification section configured to notify information to a user, and a control section, wherein the control section is configured to control a transport speed of the document by the transport section based on a transfer speed of the image data by the transfer section and, when the transport speed is changed, to cause the notification section to notify using a change notification A1 indicating a change in the transport speed.

11 Claims, 14 Drawing Sheets

| COMMUNICATION SPEED | TRANSFER SPEED | TRANSPORT SPEED | DATA GENERATION SECTION | NOTIFICATION |
|---|---|---|---|---|
| EQUAL TO OR HIGHER THAN R1 | EQUAL TO OR MORE THAN S1 | V1 | NORMAL MODE | — |
| LOWER THAN R1 AND EQUAL TO OR HIGHER THAN R2 | LESS THAN S1 AND EQUAL TO OR MORE THAN S2 | V2 | FIRST POWER SAVING MODE | CHANGE NOTIFICATION |
| LOWER THAN R2 AND EQUAL TO OR HIGHER THAN R3 | LESS THAN S2 AND EQUAL TO OR MORE THAN S3 | V3 | SECOND POWER SAVING MODE | CHANGE NOTIFICATION IMPROVEMENT NOTIFICATION |
| LOWER THAN R3 | LESS THAN S3 | V4 | SECOND POWER SAVING MODE | CHANGE NOTIFICATION IMPROVEMENT NOTIFICATION ERROR NOTIFICATION |

(52) U.S. Cl.
CPC ..... *H04N 1/00824* (2013.01); *H04N 1/33376* (2013.01); *H04N 2201/0081* (2013.01); *H04N 2201/3335* (2013.01)

(58) Field of Classification Search
CPC ....... H04N 1/33376; H04N 2201/0081; H04N 2201/3335
See application file for complete search history.

(56) References Cited

U.S. PATENT DOCUMENTS

| | | | | |
|---|---|---|---|---|
| 7,742,201 | B2* | 6/2010 | Murata | H04N 1/0402 |
| | | | | 358/448 |
| 8,717,610 | B2* | 5/2014 | Dowling | H04L 63/126 |
| | | | | 358/1.14 |
| 8,879,094 | B2* | 11/2014 | Nakata | H04N 1/00795 |
| | | | | 358/1.14 |
| 10,462,316 | B2* | 10/2019 | Tabuki | B65H 5/002 |
| 11,363,154 | B2* | 6/2022 | Shinohara | H04N 1/121 |
| 2007/0070435 | A1* | 3/2007 | Wang | H04N 1/33307 |
| | | | | 358/426.03 |
| 2008/0037055 | A1* | 2/2008 | Yun | H04N 1/00217 |
| | | | | 358/1.15 |
| 2014/0085667 | A1 | 3/2014 | Ueda | |
| 2015/0124298 | A1* | 5/2015 | Sung | H04N 1/36 |
| | | | | 358/474 |
| 2024/0129417 | A1* | 4/2024 | Takamatsu | H04N 1/00824 |

FOREIGN PATENT DOCUMENTS

| | | |
|---|---|---|
| JP | 2012-029075 A | 2/2012 |
| JP | 2014-068245 A | 4/2014 |
| JP | 2014-072565 A | 4/2014 |
| JP | 2022-017918 A | 1/2022 |

* cited by examiner

| COMMUNICATION SPEED | TRANSFER SPEED | TRANSPORT SPEED | DATA GENERATION SECTION | NOTIFICATION |
|---|---|---|---|---|
| EQUAL TO OR HIGHER THAN R1 | EQUAL TO OR MORE THAN S1 | V1 | NORMAL MODE | — |
| LOWER THAN R1 AND EQUAL TO OR HIGHER THAN R2 | LESS THAN S1 AND EQUAL TO OR MORE THAN S2 | V2 | FIRST POWER SAVING MODE | CHANGE NOTIFICATION |
| LOWER THAN R2 AND EQUAL TO OR HIGHER THAN R3 | LESS THAN S2 AND EQUAL TO OR MORE THAN S3 | V3 | SECOND POWER SAVING MODE | CHANGE NOTIFICATION IMPROVEMENT NOTIFICATION |
| LOWER THAN R3 | LESS THAN S3 | V4 | SECOND POWER SAVING MODE | CHANGE NOTIFICATION IMPROVEMENT NOTIFICATION ERROR NOTIFICATION |

FIG. 10

READING DEVICE AND CONTROL METHOD WITH NOTIFICATION OF AN ERROR OR IMPROVEMENT ASSOCIATED WITH DOCUMENT TRANSPORT AND DATA TRANSFER SPEED

The present application is based on, and claims priority from JP Application Serial Number 2022-137257, filed Aug. 30, 2022, and from JP Application Serial Number 2022-137258, filed Aug. 30, 2022, the disclosures of which are hereby incorporated by reference herein in their entirety.

BACKGROUND

1. Technical Field

The present invention relates to a reading device and a method for controlling the reading device.

2. Related Art

JP-A-11-215326 describes a reading device that changes a document reading speed on the basis of the amount of image stored in a buffer, an image data transfer speed, and the like.

In the reading device described in JP-A-11-215326, when the transfer speed is low, the reading speed is automatically reduced. In this case, there is a concern that the user may erroneously consider that a failure, a defect, or the like has occurred in the reading device

SUMMARY

A reading device that resolves the above-described problem is a reading device connected to an external device and includes a transport section configured to transport a document; a reading section configured to read the document transported by the transport section; a data generation section configured to generate image data of the document read by the reading section; a transfer section configured to transfer the image data to the external device; a notification section configured to notify information to a user; and a control section, wherein the control section is configured to control a transport speed of the document by the transport section based on a transfer speed of the image data by the transfer section and when the transport speed is changed, cause the notification section to notify using a change notification indicating a change in the transport speed.

A reading device that resolves the above-described problem is a reading device connected to an external device and includes a transport section configured to transport a document; a reading section configured to read the document transported by the transport section; a data generation section configured to generate image data of the document read by the reading section; a transfer section configured to transfer the image data to the external device; a notification section configured to notify information to a user; and a control section, wherein the control section is configured to control a transport speed of the document by the transport section based on a transfer speed of the image data transferred by the transfer section and, when the transfer speed is less than an improvement threshold value, cause the notification section to issue an improvement notification for prompting improvement of the transfer speed.

A method for controlling a reading device that resolves the above-described problem is a method for controlling a reading device that, by reading a transported document, generates image data of the document and the method includes changing a transport speed of the document based on a transfer speed of the image data transferred from the reading device to an external device and notifying about a change in the transport speed when changing the transport speed.

BRIEF DESCRIPTION OF THE DRAWINGS

FIG. 10 is a table illustrating an example of a correspondence relationship between the transfer speed and the transport speed.

DESCRIPTION OF EMBODIMENTS

Hereinafter, an embodiment of a reading device will be described with reference to the drawings. The reading device is, for example, a sheet feed scanner that by transporting a document such as a sheet or film, reads an image such as a character or a photograph recorded on the document.

Figure 1:
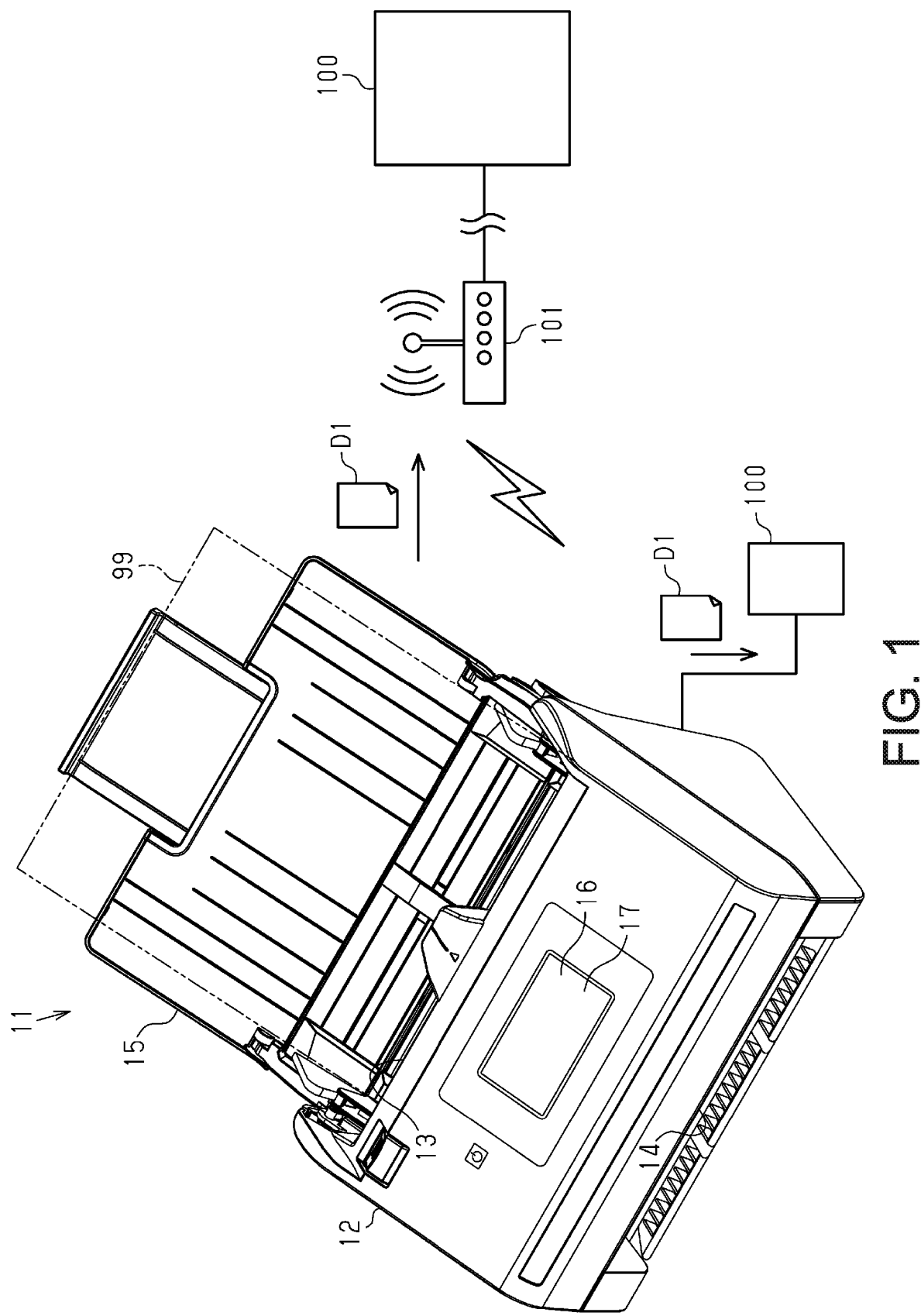
FIG. 1 is a perspective view showing an embodiment of a reading device.

As illustrated in FIG. 1, the reading device 11 is connected to one or more external devices 100. The reading device 11 transfers the image data D1 of the document 99 that was read to the external device 100. Accordingly, the image data D1 is stored in the external device 100.

The reading device 11 is, for example, directly connected to the external device 100. The external device 100 includes a storage medium such as a USB memory or an SD card.

The reading device 11 is connected to the external device 100 by, for example, wireless communication. The external device 100 includes, for example, a personal computer, a smartphone, a tablet, and a server. The reading device 11 communicates with the external device 100 by, for example, accessing a separately-installed access point 101. The access point 101 is, for example, a LAN router.

The reading device 11 includes a housing 12. A supply port 13 is opened in the housing 12. The document 99 is supplied into the housing 12 through the supply port 13. A discharge port 14 is opened in the housing 12. The document 99 is discharged from the housing 12 through the discharge port 14.

The reading device 11 includes a supply tray 15. The supply tray 15 is attached to the housing 12, for example. The supply tray 15 extends from the supply port 13 toward outside of the housing 12. One or more documents 99 are set on the supply tray 15. By setting the document 99 on the supply tray 15, the document 99 is transported into the housing 12 through the supply port 13.

The supply tray 15 may be configured so that it can be accommodated in the housing 12. For example, the supply tray 15 may be accommodated in the housing 12 or pulled out from the housing 12 by sliding. The supply tray 15 may be configured to be foldable.

The reading device 11 may include a discharge tray. The discharge tray extends, for example, from the discharge port 14 toward outside the housing 12. The discharge tray receives the document 99 discharged from the discharge port 14. The discharge tray may be configured to be slidable or may be configured to be foldable.

The reading device 11 may include a display section 16. The display section 16 is attached to the housing 12. The display section 16 is configured to display information. The display section 16 is, for example, a liquid crystal display. The display section 16 is not limited to a liquid crystal display and may be a lamp. The display section 16 may display the communication speed of wireless communication. The communication speed is a speed of communication between the reading device 11 and the access point 101. The specific content displayed by the display section 16 will be described later.

The reading device 11 may include an operation section 17. The operation section 17 is attached to the housing 12. The operation section 17 is, for example, a touch panel, a button, or a lever. The user operates the operation section 17 to operate the reading device 11 or give an instruction to the reading device 11. For example, the user may operate the reading device 11 or give an instruction to the reading device 11 via a personal computer connected to the reading device 11.

The user can designate the transfer destination of the image data D1 by operating the operation section 17, for example. The user can designate the external device 100 directly connected to the reading device 11 as the transfer destination or designate the external device 100 wirelessly connected to the reading device 11 as the transfer destination. The user may designate the transfer destination via a personal computer connected to the reading device 11.

Figure 2:
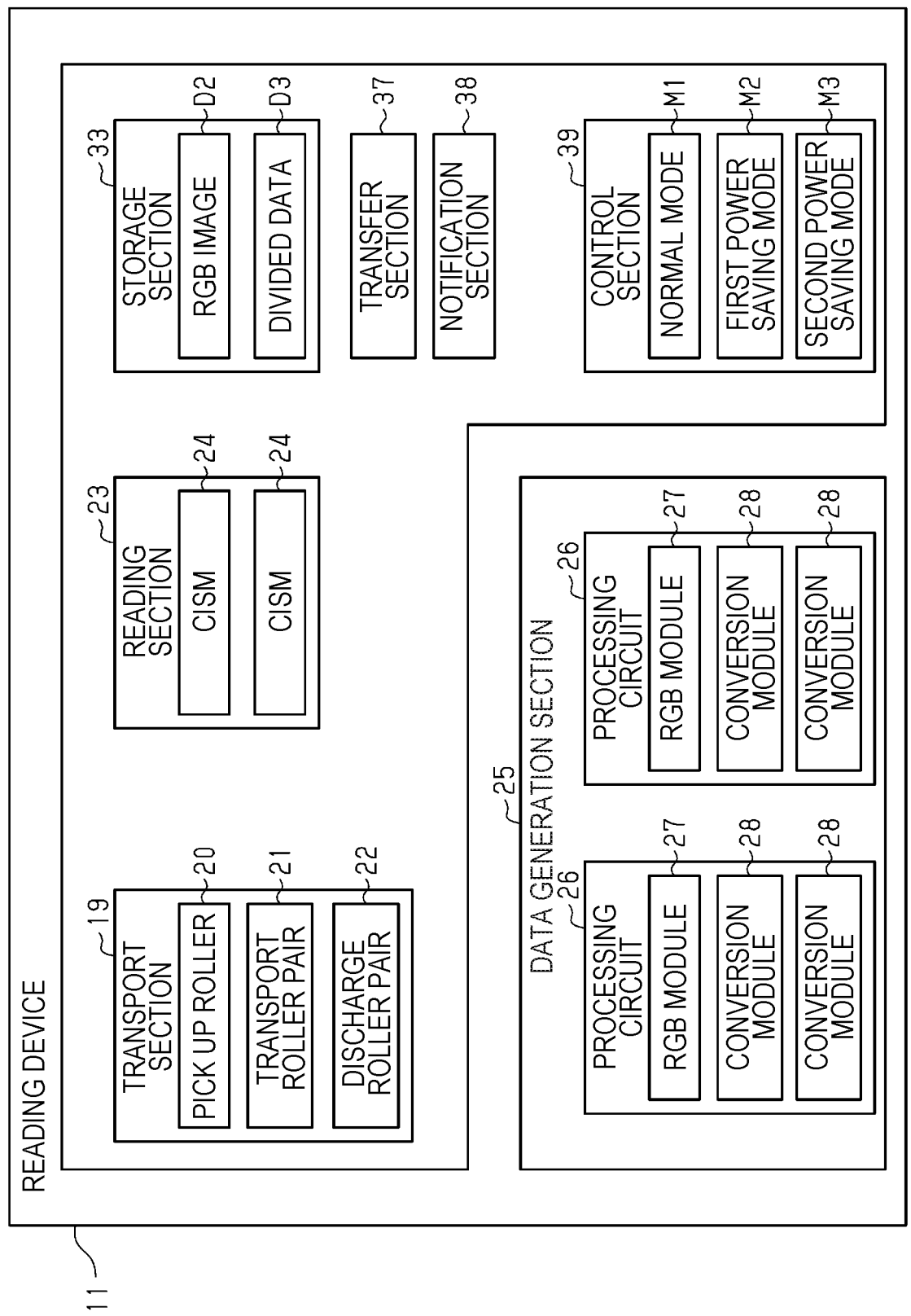
FIG. 2 is a block diagram of the reading device.

As shown in FIG. 2, the reading device 11 includes a transport section 19. The transport section 19 is configured to transport the document 99. The transport section 19 includes one or more rollers. The transport section 19 includes, for example, a pick up roller 20 that sequentially transports sheets of the document 99 stacked on the supply tray 15. The transport section 19 may include a separation roller that separates the document 99 one sheet at a time. The transport section 19 may include a transport roller pair 21 that transports the document 99 to a reading section 23 (to be described later) and a discharge roller pair 22 that discharges the document 99 that was read by the reading section 23. Each of the transport roller pair 21 and the discharge roller pair 22 may include a driving roller and a driven roller, or may include two driving rollers. The transport section 19 sequentially transports sheets of the document 99 at predetermined intervals. For example, the pick up roller 20 starts to transport the next document 99 after reading of the preceding document 99 is completed. The transport roller pair 21 and the discharge roller pair 22 sequentially transport the document 99 that was transported by the pick up roller 20. As a result, the following document 99 is supplied while the preceding document 99 is discharged by the transport section 19.

The reading device 11 includes a reading section 23. The reading section 23 is configured to read a document 99. The reading section 23 reads the document 99 transported by the transport section 19. The reading section 23 includes at least one CISM 24. The CISM 24 is, for example, a line sensor elongated in the widthwise direction of the document 99. The CISM 24 reads the transported document 99 one line at a time.

The reading section 23 may include two CISMs 24. In this case, one of the two CISMs 24 reads the front surface of the document 99 and the other reads the rear surface of the document 99. That is, the two CISMs 24 are positioned so as to sandwich the document 99. Using the two CISMs 24, the reading section 23 can read the front surface of the document 99 and the rear surface of the document 99 in parallel. The reading section 23 may read the front surface of the document 99 and the rear surface of the document 99 with one CISM 24. In this case, after reading the front surface of the document 99, the reading device 11 may read the rear surface of the document 99 by, for example, reversing and transporting the document 99.

The reading device 11 includes a data generation section 25. The data generation section 25 is configured to generate the image data D1 of the document 99. The data generation section 25 generates the image data D1 read by the reading section 23. The data generation section 25 includes one or more processing circuits 26. The data generation section 25 includes, for example, two processing circuits 26. The processing circuits 26 are connected to the CISMs 24. One of two processing circuits 26 may be connected one of two CISMs 24 and the other of the two processing circuits 26 connected to the other of the two CISMs 24. One processing circuit 26 may be connected to two CISMs 24. The number of processing circuits 26 may be equal to or greater than the number of CISMs 24. By using two processing circuits 26, the data generation section 25 can generate data of the front surface of the document 99 and data of the rear surface of the document 99 in parallel. The processing circuit 26 is constituted by, for example, a software processing circuit including one or more CPUs and a circuit including a hardware circuit.

The processing circuit 26 comprises an RGB module 27. The RGB module 27 generates an RGB image D2 from the read values of the reading section 23. For example, the RGB module 27 converts the values detected by the CISM 24 into 256 gray scale values of red, green, and blue. By this, the RGB image D2 is generated. The RGB module 27 is, for example, a hardware circuit such as an ASIC.

The processing circuit 26 may perform image processing on the RGB image D2. The image processing includes, for example, inclination correction and cutout correction. The inclination correction is a process on the RGB image D2 of correcting an inclination of a region corresponding to the document 99. The cutout correction is correction in the RGB image D2 for cutting out a region corresponding to the document 99. The content of the image processing is set in advance, for example, when the document 99 is read.

The processing circuit 26 includes one or more conversion modules 28. The processing circuit 26 includes, for example, two conversion modules 28. The conversion module 28 performs a conversion process on the RGB image D2 to generate image data D1. For example, the conversion module 28 performs color conversion, compression conversion, and the like on the RGB image D2. The conversion module 28 is, for example, a hardware circuit such as an ASIC.

The conversion module 28 performs conversion processing on the RGB image D2 for each predetermined number of lines. For example, the conversion module 28 performs the conversion process on the RGB image D2 in sections of eight lines. In the processing circuit 26, two conversion modules 28 perform conversion processing on a single RGB image D2 on a predetermined number of lines in parallel. For example, one of the two conversion modules 28 performs the conversion process on the data of the first line to the eighth line, and the other conversion module 28 performs the conversion process on the data of the ninth line to the sixteenth line. Thus, the greater the number of conversion modules 28 in the processing circuit 26, the greater the speed at which the image data D1 is generated.

The conversion module 28 performs a conversion process on the RGB image D2 for each predetermined number of lines to generate divided data D3. For example, with respect to the RGB image D2, the conversion module 28 generates divided data D3 by performing the conversion process on the first line to the eighth line, and generates divided data D3 by performing the conversion process on the ninth line to the sixteenth line. The divided data D3 is data obtained by dividing the image data D1. By performing the conversion process on the RGB image D2, a plurality of sets of divided data D3 are generated. The image data D1 is constituted by plural sets of divided data D3.

Figure 3:
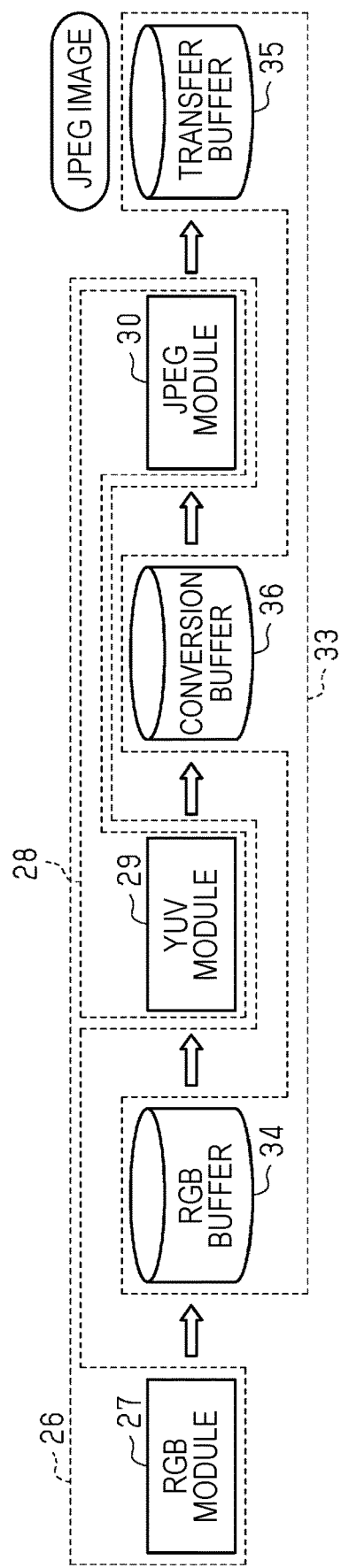
FIG. 3 is a schematic diagram showing a procedure when a JPEG image is generated as image data.
Figure 4:
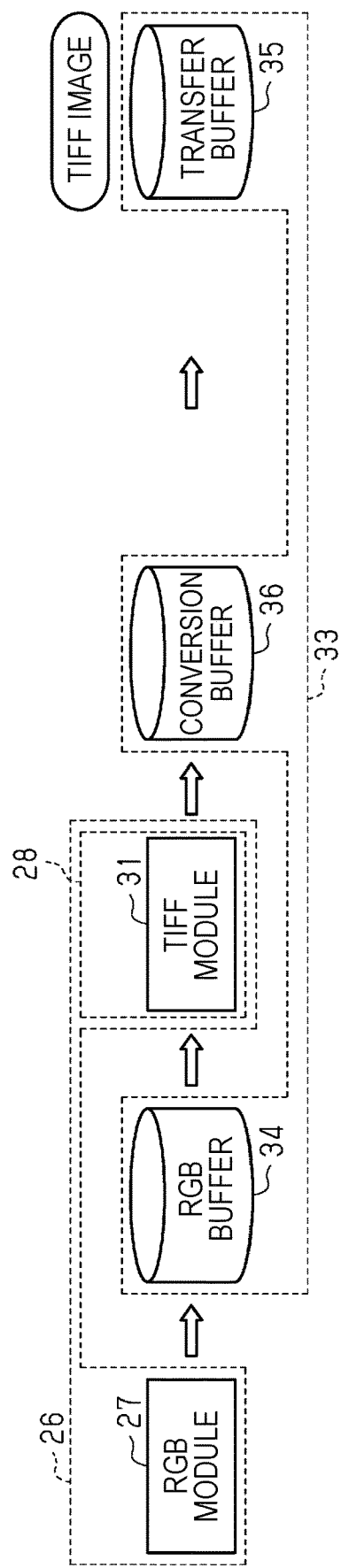
FIG. 4 is a schematic diagram showing a procedure when a TIFF image is generated as image data.

As shown in FIGS. 3 and 4, the conversion module 28 converts the RGB image D2 into a predetermined image format. The conversion module 28 converts the RGB image D2 into a predetermined image format by performing color conversion, compression conversion, or the like for each predetermined line. The conversion module 28 includes various modules so as to perform conversion into various color spaces and various image formats. The image format is set in advance, for example, when the document 99 is read.

As shown in FIG. 3, the conversion module 28 may generate a JPEG image. The conversion module 28 may include a YUV module 29 and a JPEG module 30. The YUV module 29 converts the color space of the RGB image D2 from RGB to YUV. At this time, the YUV module 29 performs color conversion on the RGB image D2 for each predetermined line. The JPEG module 30 converts the image that was converted into YUV into a JPEG image by compressing the image using a predetermined method. At this time, the JPEG module 30 performs compression conversion on the data for each predetermined line converted into YUV. By this, sets of divided data D3 of the JPEG image are sequentially generated.

Two conversion modules 28 may each include a YUV module 29 or may include a common YUV module 29. That is, two conversion modules 28 may each include one YUV module 29 and one JPEG module 30. Two conversion modules 28 may include a common YUV module 29 and each include a separate JPEG module 30.

As shown in FIG. 4, the conversion module 28 is not limited to generating a JPEG image, but may generate, for example, a TIFF image. The conversion module 28 may include a TIFF module 31. The TIFF module 31 performs color correction on the RGB image D2 to convert it into a TIFF image. At this time, the TIFF module 31 performs color correction on the RGB image D2 for each predetermined line. For example, the TIFF module 31 performs color correction on the RGB image D2 by converting color tone values. By this, sets of divided data D3 of the TIFF image are sequentially generated. The TIFF module 31 can, for example, convert the RGB image D2 to a monochrome scale, grayscale, or the like.

As shown in FIG. 2, the reading device 11 includes a storage section 33. The storage section 33 is, for example, a memory such as a ROM or a RAM. The storage section 33 temporarily stores, that is, buffers, data relating to the document 99 read by the reading section 23.

As shown in FIGS. 3 and 4, the storage section 33 includes, for example, an RGB buffer 34. The RGB buffer 34 is a storage area in which an RGB image D2 is temporarily stored. The RGB buffer 34 usually has a capacity large enough to store RGB images D2 for two sheets worth of document 99. The RGB image D2 is deleted from the RGB buffer 34 by completion of the conversion process for all the lines of the RGB image D2. This reduces the concern of reduced free space in the RGB buffer 34. When the free space of the RGB buffer 34 becomes zero or very small, there is a concern that the reading of the document 99 may be stopped.

The storage section 33 includes a transfer buffer 35. The transfer buffer 35 is a storage area in which the divided data D3 is temporarily stored. That is, the transfer buffer 35 stores the divided data D3 of the JPEG image, the divided data D3 of the TIFF image, and the like. Sets of divided data D3 are sequentially transferred from the transfer buffer 35 to the external device 100. After being transferred to the external device 100, the sets of divided data D3 are sequentially deleted from the transfer buffer 35. This reduces the concern of reduced free space in the transfer buffer 35. When the free space of the transfer buffer 35 becomes zero or very small, there is a concern that the reading of the document 99 may be stopped.

The storage section 33 may include a conversion buffer 36. The conversion buffer 36 is a storage area in which data of the RGB image D2 that was subjected to color conversion is temporarily stored. The conversion buffer 36 stores, for example, data converted by the YUV module 29, the TIFF module 31, or the like. Data stored in the conversion buffer 36 is sequentially transferred to the transfer buffer 35 through a predetermined process. The conversion buffer 36 may be shared with the transfer buffer 35.

As shown in FIG. 2, the reading device 11 includes a transfer section 37. The transfer section 37 is configured to transfer the image data D1 to the external device 100. The transfer section 37 is, for example, an output interface. The transfer section 37 transfers the image data D1 to, for example, an external device 100 directly connected to the reading device 11 or an external device 100 connected to the reading device 11 by wireless communication. When the transfer section 37 transfers the image data D1 to an external device 100 connected to the reading device 11 by wireless communication, for example, the transfer section 37 directly transfers the image data D1 to a folder of the external device 100, transfers the image data D1 to the external device 100 by mail, or transfers the image data D1 to the external device 100 by a cloud service.

The transfer section 37 sequentially transfers the divided data D3 stored in the transfer buffer 35 to the external device 100. That is, the transfer section 37 transfers the image data D1 for each predetermined line converted by the conversion module 28. The transfer section 37 transfers the divided data D3 to the external device 100 every time the conversion module 28 performs the conversion process for each predetermined line. When the transfer of all the divided data D3 is completed, the transfer of the image data D1 is completed.

The reading device 11 includes a notification section 38. The notification section 38 is configured to notify the user of information. The notification section 38 is, for example, an output interface. For example, the notification section 38 notifies information on the display section 16. By this, the display section 16 displays the notified information. As a result, the user grasps the information. For example, the notification section 38 may notify about the information to a personal computer owned by the user. Specific information notified by the notification section 38 will be described later together with the content displayed by the display section 16.

The reading device 11 includes a control section 39. For example, the control section 39 may integrally control the reading device 11. The control section 39 may be configured by a software processing circuit including one or more CPUs. The control section 39 may be configured by a hardware circuit such as an ASIC. The control section 39 may be configured by a circuit including a combination of a software processing circuit and a hardware circuit.

Control of Transport Speed

The control section 39 controls the transport section 19. The control section 39 controls, for example, the transport speed of the document 99 by the transport roller pair 21 and the discharge roller pair 22. The control section 39 controls the transport speed based on the transfer speed. Specifically, the control section 39 reduces the transport speed when the transfer speed is low. The transfer speed is the speed at which the divided data D3 is transferred. When the transfer speed is low, the divided data D3 accumulates in the transfer buffer 35 by the sets of divided data D3 being successively stored in the transfer buffer 35. As a result, there is a concern that free space of the transfer buffer 35 may be reduced. Therefore, when the transfer speed is low, the transport speed may be reduced. When the transport speed decreases, then the time from when the reading section 23 starts to when it completes reading the document 99, that is, the reading time, increases. Along with this, the time from start to completion of generation of the RGB image D2, that is, the generation time, becomes longer. As the generation time becomes longer, the time until generation of the image data D1 starts becomes longer. By this, the concern that the divided data D3 will accumulate in the transfer buffer 35 is reduced.

The control section 39 may control the transport speed based on the free space in the transfer buffer 35, that is, the amount of the image data D1 stored in the data generation section 25, and on the transfer speed. For example, the control section 39 may decrease the transport speed when the free space of the transfer buffer 35 is small and also the transfer speed is high. If the transport speed is high, there is a concern that the free space of the transfer buffer 35 may be reduced. For this reason, if the transport speed is high when the free space of the transfer buffer 35 is small, there is a concern that the free space of the transfer buffer 35 may become zero or very small. For example, the control section 39 may decrease the transport speed when the free space of the transfer buffer 35 is small and also the transfer speed is low. For example, the control section 39 may decrease the transport speed when the free space of the transfer buffer 35 is large and also the transfer speed is low. For example, the control section 39 may increase the transport speed when the free space of the transfer buffer 35 is large and also the transfer speed is high.

Figure 5:
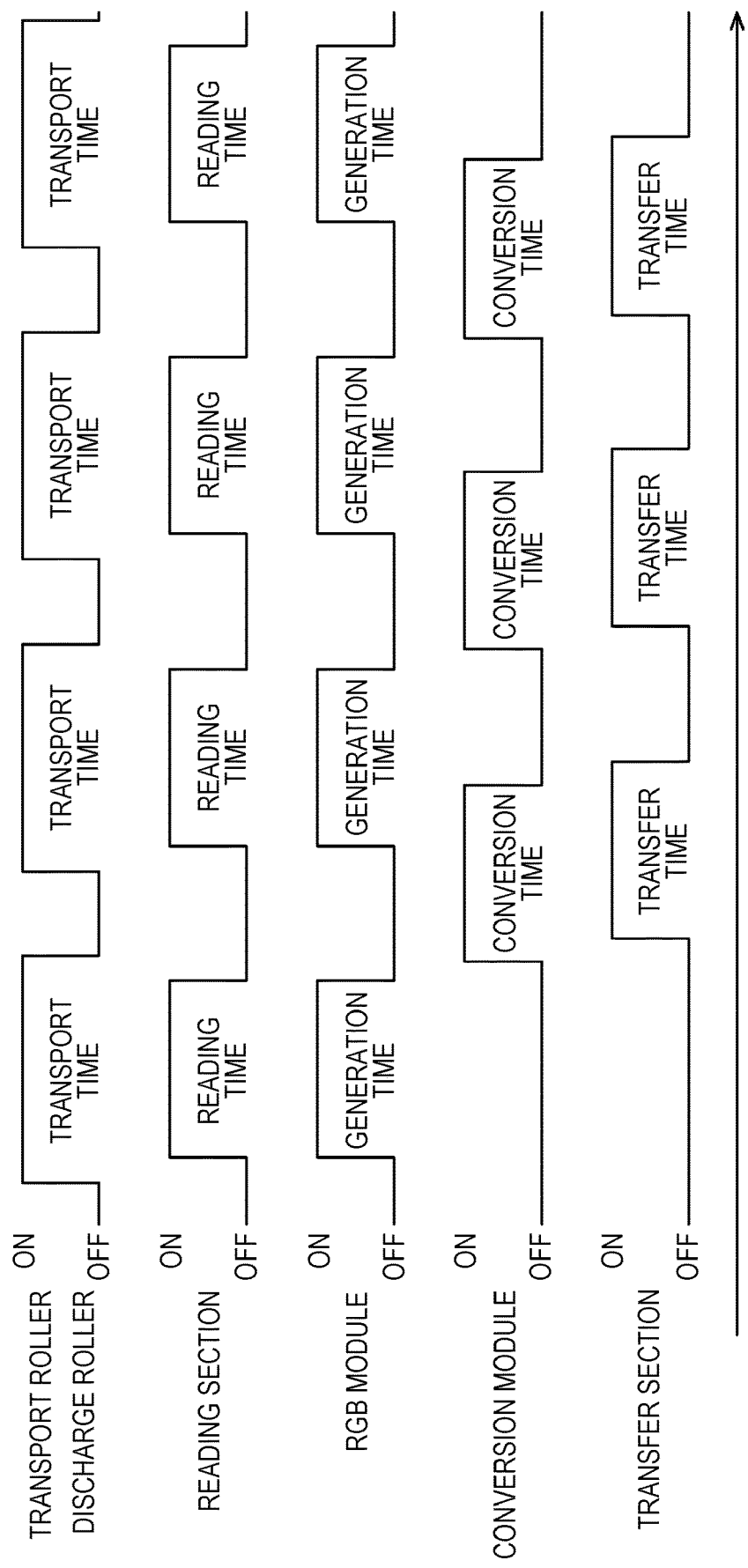
FIG. 5 is a timing chart for when a transfer speed is sufficiently high.

As shown in FIG. 5, generation of the next image data D1, that is, the first conversion process is started for the next RGB image D2 after the transfer of the image data D1 is completed, thereby reducing the possibility that the divided data D3 accumulates in the transfer buffer 35. FIG. 5 shows driving timings of the transport roller pair 21, the discharge roller pair 22, the reading section 23, the RGB module 27, the conversion module 28, and the transfer section 37. "ON" indicates that drive is being performed. "OFF" indicates that drive is not performed.

The pick up roller 20, the transport roller pair 21, and the discharge roller pair 22 are driven when the reading process of the document 99 is started. When the pick up roller 20 is driven, one sheet of document 99 is supplied from the supply tray 15. When the pick up roller 20 finishes feeding one sheet of document 99 to the transport roller pair 21, the pick up roller 20 stops. When a document 99 is set on the supply tray 15, the pick up roller 20 is driven again. For example, the pick up roller 20 is driven again when a predetermined time elapses after the reading section 23 finishes reading the document 99. By this, the next document 99 is supplied from the supply tray 15. The transport roller pair 21 and the discharge roller pair 22 are driven as the document 99 is supplied from the pick up roller 20. The transport roller pair 21 and the discharge roller pair 22 are driven in synchronization with each other. The transport roller pair 21 and the discharge roller pair 22 stop when discharge of one sheet of document 99 is completed. That is, the transport roller pair 21 and the discharge roller pair 22 stop after the reading section 23 finishes reading the document 99. In the transport section 19, the time from when the transport roller pair 21 and the discharge roller pair 22 are driven to when the transport roller pair 21 and the discharge roller pair 22 are stopped corresponds to a transport time. Note that the transport roller pair 21 and the discharge roller pair 22 may be driven without being synchronized with each other. In this case, in the transport section 19, the time from when the transport roller pair 21 is driven to when the discharge roller pair 22 is stopped corresponds to the transport time.

The document 99 reaches the reading section 23 when a predetermined time elapses after the transport roller pair 21 is driven. When the document 99 reaches the reading section 23, then the reading section 23 is driven. When reading of the document 99 is finished, the reading section 23 stops. When the next document 99 arrives, the reading section 23 is driven again. In the reading section 23, the time from the start to the completion of reading is a reading time.

The RGB module 27 is driven by start of reading by the reading section 23. When the RGB module 27 is driven, an RGB image D2 is generated from the read values of the reading section 23. That is, the RGB module 27 is driven in parallel with the reading section 23. The RGB module 27 stops when the generation of the RGB image D2 is completed. The RGB module 27 is driven again when the reading section 23 again starts reading a document 99. In the RGB module 27, the time from the start to the completion of generation of the RGB image D2 is the generation time.

After the RGB module 27 completes generation of the RGB image D2, the conversion module 28 is driven. Specifically, when the RGB image D2 is stored in the RGB buffer 34, the conversion module 28 is driven. When the processing circuit 26 performs image processing on the RGB image D2, then the conversion module 28 is driven after the image processing is completed. When the conversion module 28 is driven, the generation of the image data D1 is started. The conversion module 28 stops when conversion of the RGB image D2 is completed, that is, when generation of the image data D1 is completed. In detail, the conversion module 28 stops when RGB image D2 is not stored in the RGB buffer 34. In the conversion module 28, the time from the start to the completion of the conversion process is the conversion time.

After the conversion module 28 starts to generate image data D1, the transfer section 37 is driven. Specifically, when the divided data D3 is stored in the transfer buffer 35, the transfer section 37 is driven. That is, after the conversion module 28 completes the generation of the first set of divided data D3, the transfer section 37 is driven. The transfer section 37 stops when the transfer of the image data D1 is completed, that is, when the transfer of all the divided data D3 is completed. Specifically, the transfer section 37 is stopped when divided data D3 is not stored in the transfer buffer 35. In the transfer section 37, the time from the start to the completion of transfer of image data D1 is the transfer time. In other words, the transfer time is the time from the start of transfer of the first set of divided data D3 to the completion of transfer of the last set of divided data D3.

The transfer time is affected by the communication speed between the reading device 11 and the access point 101, the processing speed of the external device 100, and the like. Therefore, the transfer speed may become lower than normal due to the environment at that time, and the transfer time may become longer.

Figure 6:
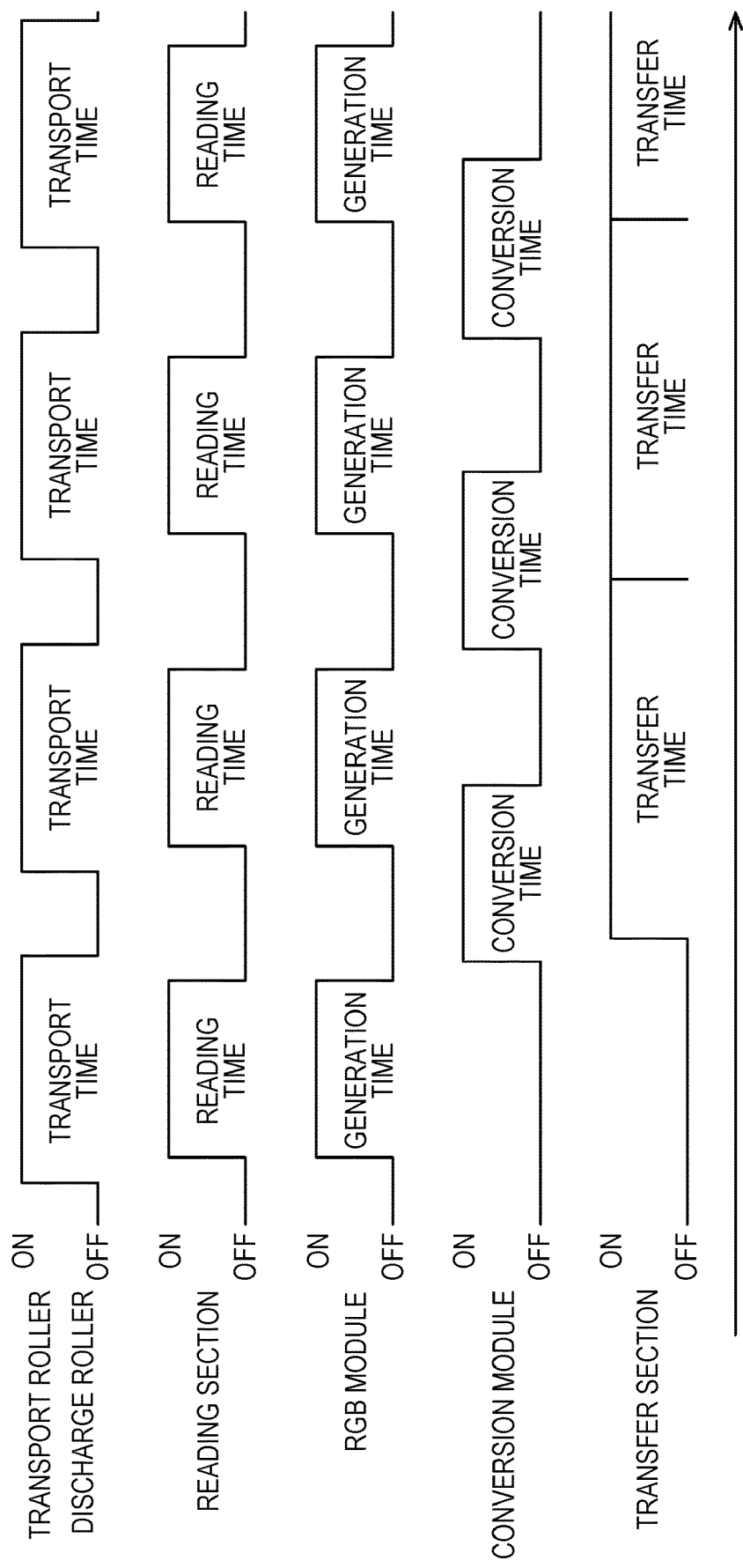
FIG. 6 is a timing chart for when the transfer speed is low.

As shown in FIG. 6, when the transfer time is long, then generation of the next set of image data D1, that is, the first conversion process for the next RGB image D2, is sometimes started before the transfer of the image data D1 is completed. In this case, since the speed at which the divided data D3 is input to the transfer buffer 35 is higher than the speed at which the divided data D3 is output from the transfer buffer 35, there is a concern that the divided data D3 may accumulate in the transfer buffer 35. As the divided data D3 accumulates in the transfer buffer 35, the free space of the transfer buffer 35 gradually decreases. Therefore, before generation of the image data D1 is started, that is, before the conversion module 28 starts the next conversion process, it is necessary to complete transfer of the previous set of image data D1.

Figure 7:
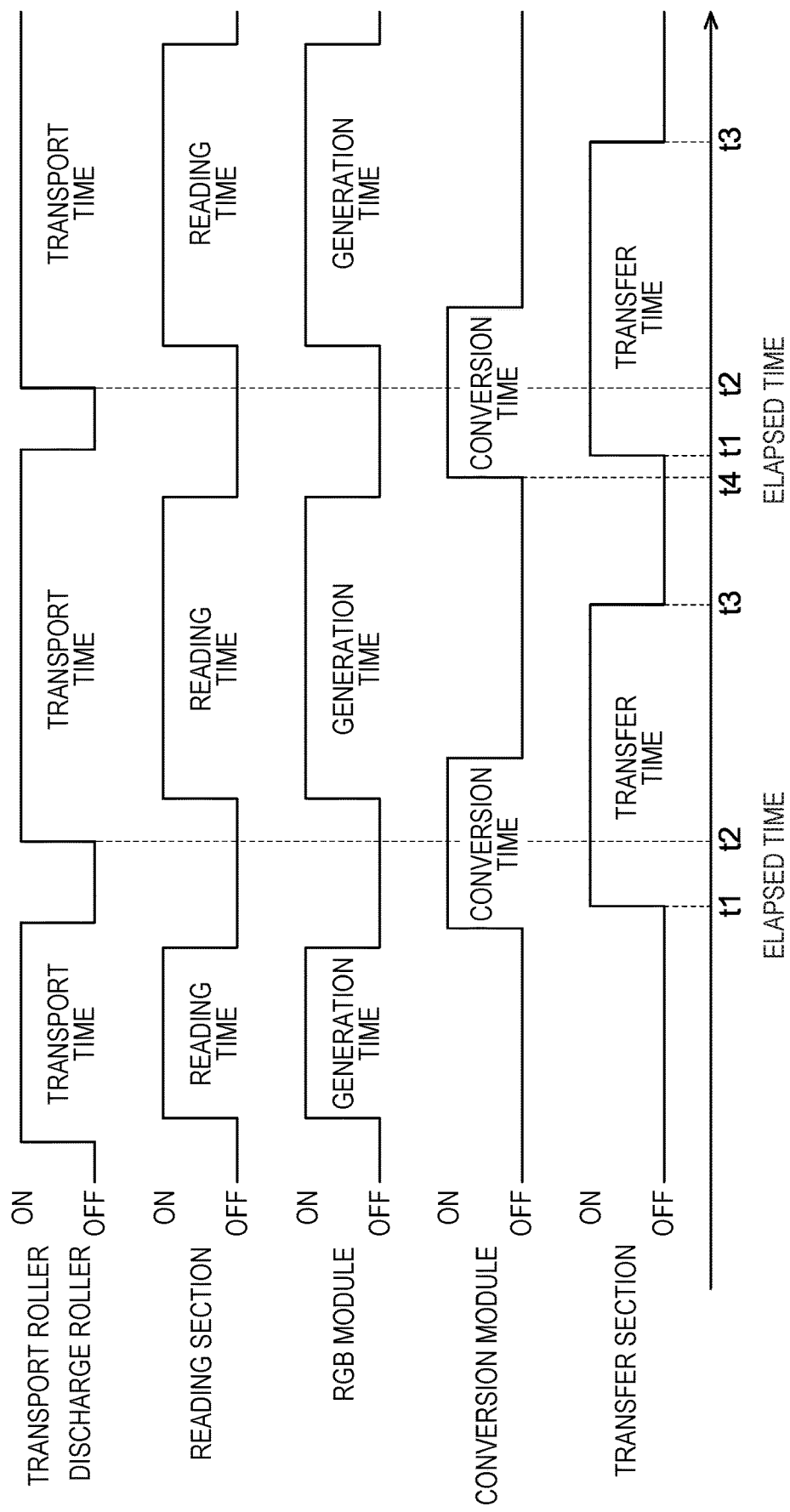
FIG. 7 is a timing chart for when a transport speed is controlled based on the transfer speed.

As shown in FIG. 7, when the transport time becomes long, the reading time and the generation time become long. As the generation time becomes longer, the timing at which the conversion module 28 starts the conversion process becomes later. That is, a longer transport time results in a longer time until the conversion module 28 starts the next conversion process. As a result, after transfer of the image data D1 is completed, generation of the next image data D1 is started. In this way, when the transport time becomes long, the time that the transfer section 37 can spend transferring the image data D1 increases. This reduces the concern of reduced free space in the transfer buffer 35. Therefore, the control section 39 increases the transport time when the transfer time is long. The control section 39 increases the transport time by decreasing the transport speed. The control section 39 reduces the transport speed by reducing the rotation speed of the rollers included in the transport section 19.

When the transport speed decreases, not only the transport time, the reading time, and the generation time, but also the transport interval of the document 99 by the transport roller pair 21 and the discharge roller pair 22, the reading interval of the document 99 by the reading section 23, the generation interval of the RGB image D2 by the RGB module 27, and the like may become longer. As a result, the time that can be used to generate one sheet worth of image data D1 increases.

In FIG. 7, t1 indicates a timing at which the transfer of the first set of divided data D3 is started. "t2" indicates a timing at which transport of the next document 99 is started. "t3" indicates a timing at which the transfer of the last of the divided data D3 is completed. Therefore, the time from t1 to t3 is the transfer time. "t4" indicates the timing to start the conversion process for the next RGB image D2.

The control section 39 controls the transport speed so that the t3 is positioned before t4. That is, the control section 39 controls the transport speed so that the transfer of the previous image data D1 is completed by the time generation of the image data D1 is started. As the transport speed decreases, that is, as the transport time increases, the timing of t4 is delayed. By this, the concern that the divided data D3 will accumulate in the transfer buffer 35 is reduced. On the other hand, when t3 is positioned at or after t4, divided data D3 accumulates in the transfer buffer 35.

The control section 39 acquires the transfer speed in order to control the transport speed. The control section 39 acquires the transfer speed from, for example, the elapsed time from the start of transfer of the first set of divided data D3 to the start of transport of the next document 99 and the data amount of the divided data D3 transferred within the elapsed time. That is, the control section 39 acquires the transfer speed from the elapsed time from t1 to t2 and the amount of divided data D3 transferred within that elapsed time. Based on the acquired transfer speed, the control section 39 controls the transport speed of the document 99 that starts to be transported at t2.

The control section 39 may estimate the transfer time based on the transfer speed. That is, the control section 39 may estimate the transfer time based on the amount of the divided data D3 transferred during the elapsed time from t1 to t2. For example, the control section 39 can estimate the time required to complete the transfer of all the divided image data D3 from the data amount of the RGB image D2 and from the amount of the divided data D3 that has been transferred at the time of t2.

The control section 39 may control the transport speed based on not only the transfer speed but also the communication speed. The transfer speed depends on the communication speed. When the communication speed is low, the transfer speed becomes low. Therefore, the control section 39 may decrease the transport speed when the communication speed is low.

When plural sheets of document 99 are read in succession, the control section 39 may control the transport speed of the first sheet of document 99 based on the communication speed. This is because the most recent transfer speed cannot be measured when the first sheet of document 99 is read since the transfer speed is measured by the transfer of the divided data D3. For example, the control section 39 acquires the communication speed before starting transport of the first sheet of document 99. The control section 39 controls the transport speed for the first sheet of document 99 based on the communication speed.

The control section 39 may supply the first sheet of document 99 at the normal transport speed regardless of the communication speed. This is because there is little possibility that the free space of the transfer buffer 35 will be reduced only by reading the first sheet of document 99. The control section 39 may cause the first sheet of document 99 to be transported at the transport speed applied in the previous job. Specifically, the control section 39 may determine the transport speed for the first sheet of document 99 in the current reading process based on the transfer speed used to determine the transport speed for the last document 99 in the previous reading process.

The control section 39 may control the transport speed of the second and subsequent sheets of document 99 based on the transfer speed. Even when the communication speed is high, the transfer speed may be low when the processing by the external device 100 is delayed. Therefore, the transport speed based on the transfer status of the divided data D3 can be controlled more accurately by controlling the transport speed based on the transfer speed than by controlling the transport speed based on the communication speed.

The control section 39 may change the transport speed based on the transfer speed from the end of reading the preceding document 99 to start of transport of the subsequent document 99. In this case, compared to a case where the transport speed is changed in the middle of reading of the document 99, a possibility that reading quality deteriorates is reduced.

Control of Power Supply

As shown in FIG. 2, the control section 39 may control the data generation section 25. For example, the control section 39 may control power supply to the data generation section 25. The control section 39 restricts the function of the data generation section 25 by controlling power supply to the data generation section 25. For example, the control section 39 switches the data generation section 25 between the normal mode M1 and one or more power saving modes by controlling power supply to the data generation section 25. To be more specific, the control section 39 switches from the normal mode M1 to a power saving mode by reducing the amount of power supplied to the data generation section 25.

The normal mode M1 is a mode in which the data generation section 25 exhibits its inherent performance. In the normal mode M1, the data generation section 25 generates the image data D1 at high speed.

The power saving mode is a mode in which the function of the data generation section 25 is restricted. That is, the power saving mode is a mode in which the performance of the data generation section 25 is lower than in the normal mode M1. Sometimes the data generation section 25 generates image data D1 at a lower speed in the power saving mode than in the normal mode M1. In this case, sometimes it takes more time to generate the image data D1 for one sheet worth of document 99.

For example, the control section 39 may switch from the normal mode M1 to the power saving mode by supplying power to only one processing circuit 26 of the two processing circuits 26. When power is supplied to only one processing circuit 26, when the reading section 23 reads both sides of the document 99, one processing circuit 26 generates the image data D1 for the front surface of the document 99 and for the rear surface of the document 99. In this case, processing is less efficient than when power is supplied to two processing circuits 26, and therefore the time required to generate one sheet worth of image data D1 is longer. In the case where power is supplied to only one processing circuit 26, when the reading section 23 reads one side of the document 99, the one processing circuit 26 generates the image data D1 for the one side of the document 99. In this case, there is no change in the time required to generate one sheet worth of image data D1 compared to the case where power is supplied to two processing circuits 26.

The control section 39 may, for example, switch from the normal mode M1 to the power saving mode by supplying power to only one of the two conversion modules 28. When power is supplied to only one conversion module 28, the conversion rate of the RGB image D2 decreases regardless of whether the reading section 23 reads both sides or only one side of the document 99, and thus the conversion time increases. Therefore, in this case, the time needed to generate one sheet worth of image data D1 increases.

The control section 39 restricts the function of the data generation section 25 by restricting power supply to the processing circuit 26, the conversion module 28, or both of them. The control section 39 limits the processing capability of the data generation section 25 by limiting the power supply to the data generation section 25.

One or more power saving modes include, for example, a first power saving mode M2 and a second power saving mode M3. Therefore, the control section 39 switches among the normal mode M1, the first power saving mode M2, and the second power saving mode M3 by controlling power supply to the data generation section 25.

The first power saving mode M2 is a mode in which the amount of power supply is smaller than that in the normal mode M1. The first power saving mode M2 consumes less power than the normal mode M1. In this respect, the data generation section 25 driven in the first power saving mode M2 consumes less power than the data generation section 25 driven in the normal mode M1. The control section 39 switches the processing circuit 26 to the first power saving mode M2 by supplying power to only one of two conversion modules 28. That is, the first power saving mode M2 is a mode in which only two conversion modules 28 among the four conversion modules 28 in the data generation section 25 are driven.

The second power saving mode M3 is a mode in which the amount of power supply is smaller than that in the first power saving mode M2. The second power saving mode M3 consumes less power than the first power saving mode M2. In this respect, the data generation section 25 driven in the second power saving mode M3 consumes less power than the data generation section 25 driven in the first power saving mode M2. The control section 39 switches to the second power saving mode M3 by supplying power to only one processing circuit 26 of two processing circuits 26. That is, the second power saving mode M3 is a mode in which only one conversion module 28 of the four conversion modules 28 in the data generation section 25 is driven.

The control section 39 may control the power supply to the data generation section 25 based on the transfer speed. That is, the control section 39 may restrict the function of the data generation section 25 based on the transfer speed. Even if the data generation section 25 generates the image data D1 at a high speed when the transfer speed is low, the transfer speed becomes a bottleneck. When the transfer speed is low, then the transport time, the transport interval, the reading time, the reading interval, and the like increase as the control section 39 decreases the transport speed. Therefore, the time that can be used to generate one sheet worth of image data D1 increases. Therefore, there is no problem even if the data generation section 25 generates the image data D1 at a low speed in accordance with the low transfer speed.

Figure 8:
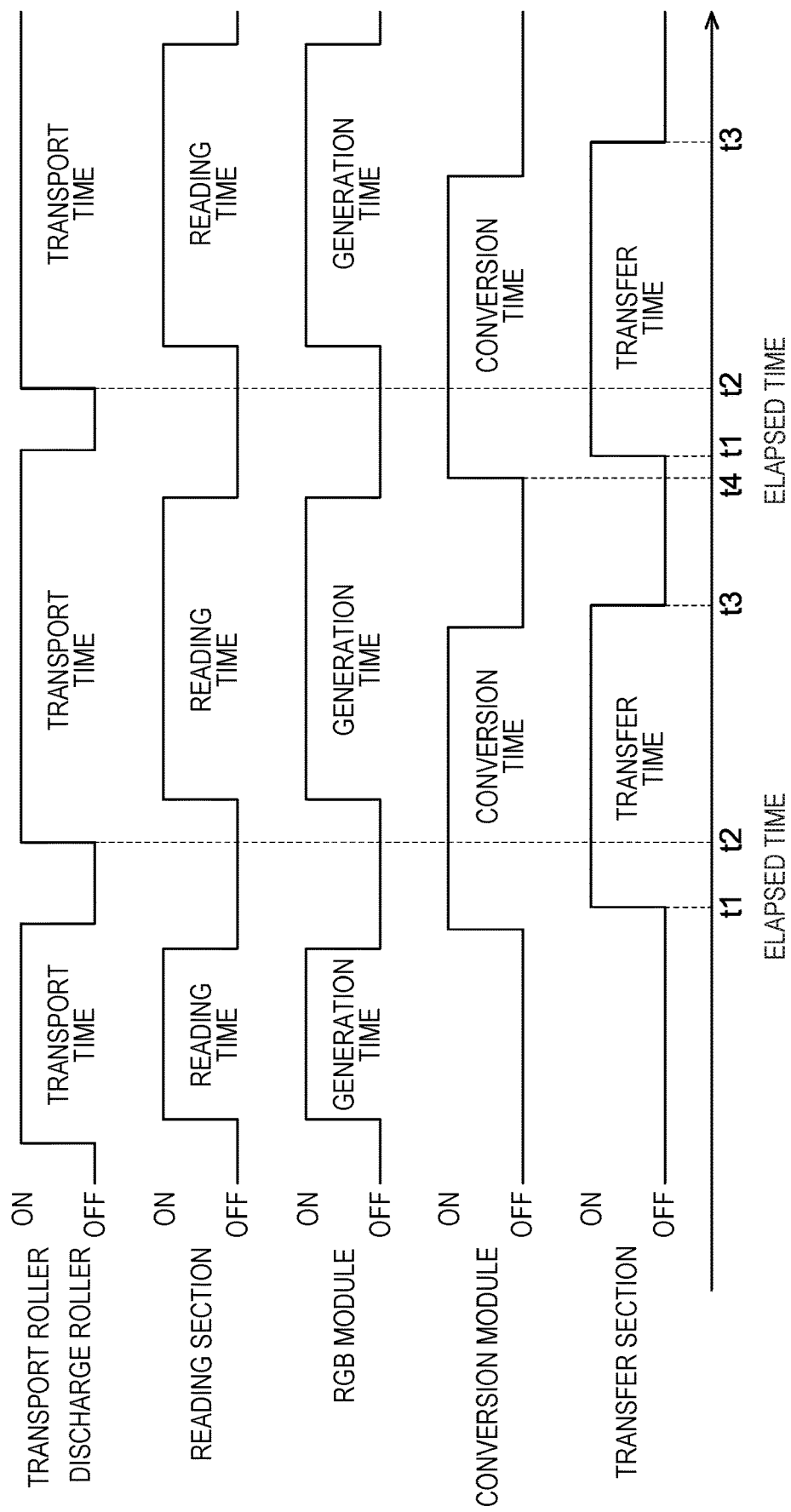
FIG. 8 is a timing chart for when the transport speed and power supply to a conversion module are controlled based on the transfer speed.

As shown in FIG. 8, when the control section 39 decreases the transport speed, the reading time, the reading interval, and the like are increased, so that the conversion time can be increased. Therefore, when the transfer speed is low, the control section 39 may restrict the function of the data generation section 25 by supplying power to only one conversion module 28 of two conversion modules 28. As a result, power consumption is reduced. It is sufficient that the conversion process be completed by the time generation of the next RGB image D2 is completed.

Figure 9:
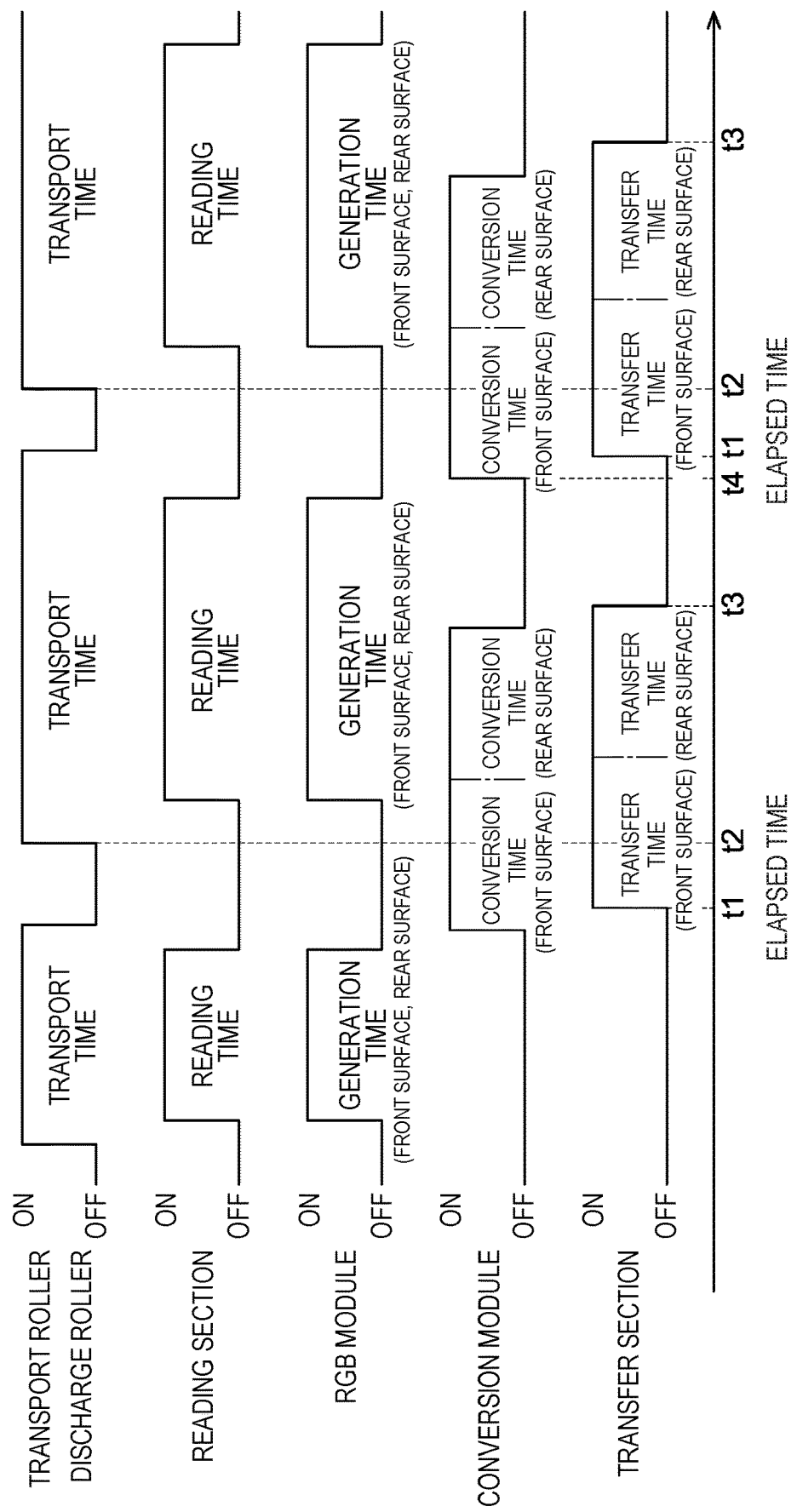
FIG. 9 is a timing chart for when the transport speed and power supply to a processing circuit are controlled based on the transfer speed.

As shown in FIG. 9, the reading time, the reading interval, and the like are increased by the control section 39 decreasing the transport speed, so that the conversion time can be increased. Specifically, by the control section 39 reducing the transport speed, it is possible to obtain two times worth of conversion time for the front surface of the document 99 and for the rear surface of the document 99. Therefore, when the transfer speed is low, the control section 39 may restrict the function of the data generation section 25 by supplying power to only one processing circuit 26 of two processing circuits 26. As a result, power consumption is reduced. It is sufficient that two times worth of conversion processing be completed before generation of the next RGB image D2 is completed.

The control section 39 may control the power supply to the data generation section 25 based not on the transfer speed but on the communication speed. When the communication speed is low, the control section 39 limits the amount of power supplied to the data generation section 25.

When a plurality of sheets of document 99 are read in succession, the control section 39 may control the power supply to the data generation section 25 for the first sheet of document 99 based on the communication speed. That is, the control section 39 may switch the data generation section 25 to a power saving mode based on the communication speed. The control section 39 may drive the data generation section 25 in the normal mode M1 for the first sheet of document 99 regardless of the communication speed.

For the second sheet and subsequent sheets of the document 99, the control section 39 may control power supply to the data generation section 25 based on the transfer speed. As in the case of the transport speed, the power supply can be controlled based on the transfer status of the divided data D3 more accurately by controlling the power supply to the data generation section 25 based on the transfer speed than by controlling the power supply to the data generation section 25 based on the communication speed.

Control of Transport Speed and Power Supply

As shown in FIG. 10, the control section 39 may control the transport speed in a plurality of stages based on the communication speed or on the transport speed. The control section 39 may control the amount of power supply to the data generation section 25 in a plurality of stages based on the communication speed or on the transport speed.

The communication speed is divided into, for example, four stages of R1, R2, R3, and R4. The communication speed is fastest to slowest in the order of R1, R2, R3, and R4. R1, R2, R3, and R4 are threshold values of the communication speed.

The transfer speed is divided into, for example, four stages of S1, S2, S3, and S4. The transfer speed is fastest to slowest in the order of S1, S2, S3, and S4. S1, S2, S3, and S4 are transfer speed threshold values.

The transport speed is divided into four stages of V1, V2, V3, and V4. The transport speed is fastest to slowest in the order of V1, V2, V3, and V4. V1, V2, V3, and V4 are set values of the transport speed. V1 is the normal transport speed.

For example, when the communication speed is equal to or higher than R1, the control section 39 changes the transport speed to V1. For example, when the communication speed is equal to or higher than R1, the control section 39 switches the data generation section 25 to the normal mode M1.

For example, when the communication speed is lower than R1 and equal to or higher than R2, the control section 39 changes the transport speed to V2. For example, when the communication speed is lower than R1 and equal to or higher than R2, the control section 39 switches the data generation section 25 to the first power saving mode M2.

For example, when the communication speed is lower than R2 and equal to or higher than R3, the control section 39 changes the transport speed to V3. For example, when the communication speed is lower than R2 and equal to or higher than R3, the control section 39 switches the data generation section 25 to the second power saving mode M3.

For example, when the communication speed is less than R3, the control section 39 changes the transport speed to V4. For example, when the communication speed is less than R3, the control section 39 switches the data generation section 25 to the second power saving mode M3.

For example, when the transfer speed is equal to or higher than S1, the control section 39 changes the transport speed to V1. For example, when the transfer speed is equal to or higher than S1, the control section 39 switches the data generation section 25 to the normal mode M1.

For example, when the transfer speed is less than S1 and equal to or greater than S2, the control section 39 changes the transport speed to V2. For example, when the transfer speed is lower than S1 and equal to or higher than S2, the control section 39 switches the data generation section 25 to the first power saving mode M2. That is, when the transfer speed is less than a first threshold value, the control section 39 switches the data generation section 25 to the first power saving mode M2.

For example, when the transfer speed is lower than S2 and equal to or higher than S3, the control section 39 changes the transport speed to V3. For example, when the transfer speed is lower than S2 and equal to or higher than S3, the control section 39 switches the data generation section 25 to the second power saving mode M3. In other words, the control section 39 switches the data generation section 25 to the second power saving mode M3 when the transfer speed is less than a second threshold value, which is less than the first threshold value.

For example, when the transfer speed is less than S3, the control section 39 changes the transport speed to V4. For example, when the transfer speed is less than S3, the control section 39 switches the data generation section 25 to the second power saving mode M3.

The control section 39 may stop the reading process when the communication speed is less than R3 or the transfer speed is less than S3. This is because when the communication speed is less than R3 or the transfer speed is less than S3, there is a concern that the divided data D3 may not be properly transferred. That is, the control section 39 may issue an error when the transfer speed is less than a third threshold value, which is smaller than the second threshold value. When the communication speed is less than R3 or the transfer speed is less than S3, for example, the control section 39 may stop the reading process after reading of the document 99 which is being read is finished. Accordingly, there is no possibility that the reading process is stopped during reading of one document 99. As a result, when reading is resumed by improvement of the transfer speed, the possibility that the reading quality deteriorates is reduced. When the reading process is restarted after being stopped during the reading of the one document 99, there is a concern that a deviation may occur in a line of image data D1.

Notification Content

Next, information notified by the notification section 38 will be described. In the present embodiment, it is assumed that the information notified by the notification section 38 is displayed on the display section 16. As described above, the information notified by the notification section 38 may be displayed on a device different from the reading device 11. For example, the notification section 38 notifies the user of information while the reading process is being performed on a group of documents 99 stacked on the supply tray 15.

The notification section 38 notifies a change notification when the control section 39 changes the transport speed. The change notification is a notification indicating that the transport speed has been changed. For example, when the transport speed is changed from V1 to V2, V3, V4, or the like, the notification section 38 issues a change notification. That is, the notification section 38 notifies the change notification when the transfer speed is less than a change threshold value, that is, less than S1. The notification section 38 may issue the change notification when the communication speed is lower than the R1. It can also be said that the notification section 38 notifies the change notification when the control section 39 switches the data generation section 25 to a power saving mode. By the change notification, the user can recognize that the transport speed changed.

When the transfer speed is less than an improvement threshold value, that is, less than S2, the notification section 38 issues an improvement notification. The improvement notification is a notification for prompting improvement of the transfer speed. The improvement notification prompts the user to improve the transfer speed by, for example, prompting the user to improve the communication speed. The notification section 38 may notify using the improvement notification when the communication speed is less than the R2. It can also be said that the notification section 38 notifies the improvement notification when the control section 39 switches the data generation section 25 to the second power saving mode M3. By the improvement notification, the user grasps that the transfer speed should be improved. The user improves the transfer speed by, for example, changing the position, posture, and the like of the reading device 11. When the position, posture, or the like of the reading device 11 is changed, the communication speed may be improved.

When the position, the posture, or the like of the reading device 11 is changed during the reading of the document 99, there is a concern that the reading quality may deteriorate. Therefore, when the transfer speed is less than the improvement threshold value, the notification section 38 may not issue the improvement notification during the reading of the document 99. For example, the notification section 38 may issue the improvement notification between the end of reading of the preceding document 99 and the start of reading of the subsequent document 99.

When the transfer speed is less than an error threshold value, that is, less than S3, the notification section 38 issues an error notification. The error threshold value is, for example, a third threshold value. The error notification is a notification of an error, that is, a notification of stopping the reading process. The notification section 38 may notify using an error notification when the communication speed is less than R3. By the error notification, the user grasps that the transfer speed is extremely low. By the error notification, it is possible to reduce a concern that the user misunderstands that reading stopped due to a defect, a failure, or the like of the reading device 11. For example, when the error notification is notified, the reading process is stopped at a time point when the reading of the document 99 which is currently being read is finished, or at a time point when the free space of the transfer buffer 35 becomes zero or very small.

Figure 13:
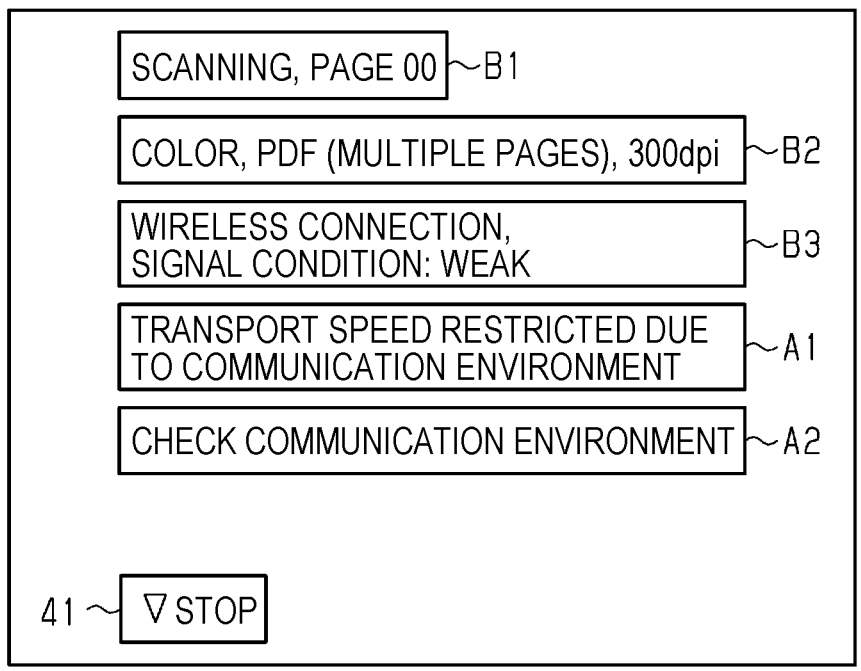
FIG. 13 is a schematic diagram showing a display screen for when the transfer speed is less than S2 and equal to or more than S3 in the transfer by wireless connection.
Figure 14:
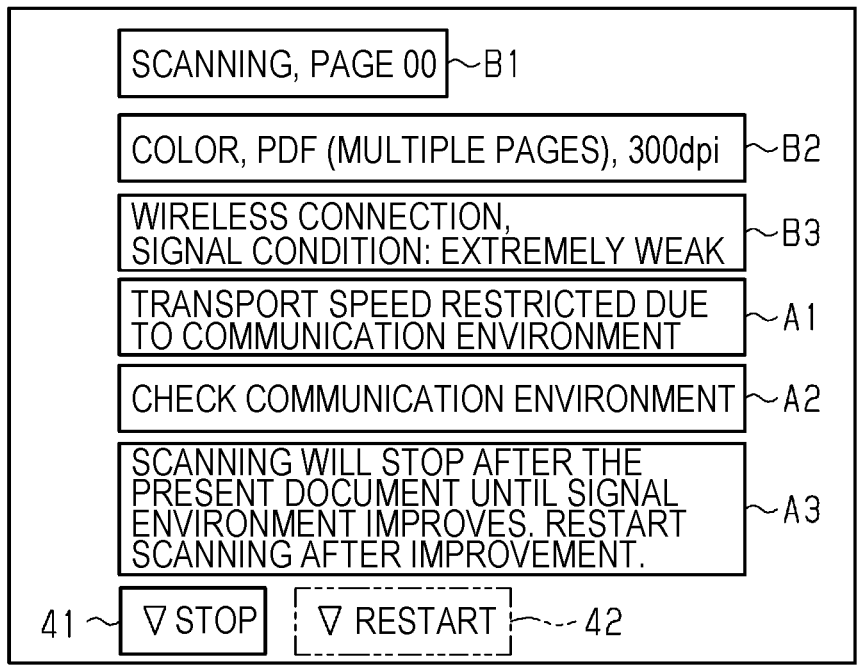
FIG. 14 is a schematic diagram showing a display screen in the case where the transfer speed is less than S3 in the transfer by wireless connection.
Figure 15:
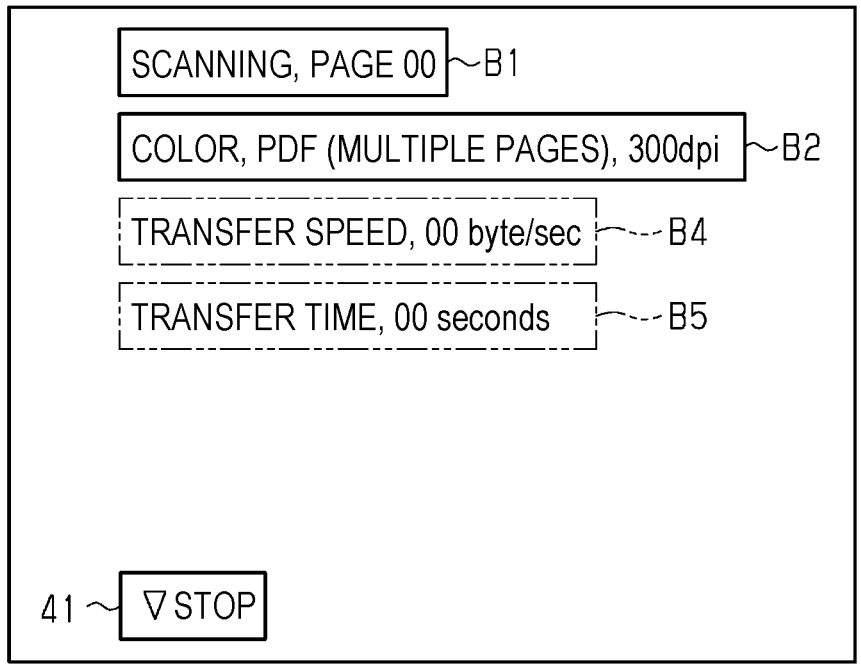
FIG. 15 is a schematic diagram showing a display screen for when the transfer speed is equal to or higher than S1 in a transfer by direct connection.
Figure 16:
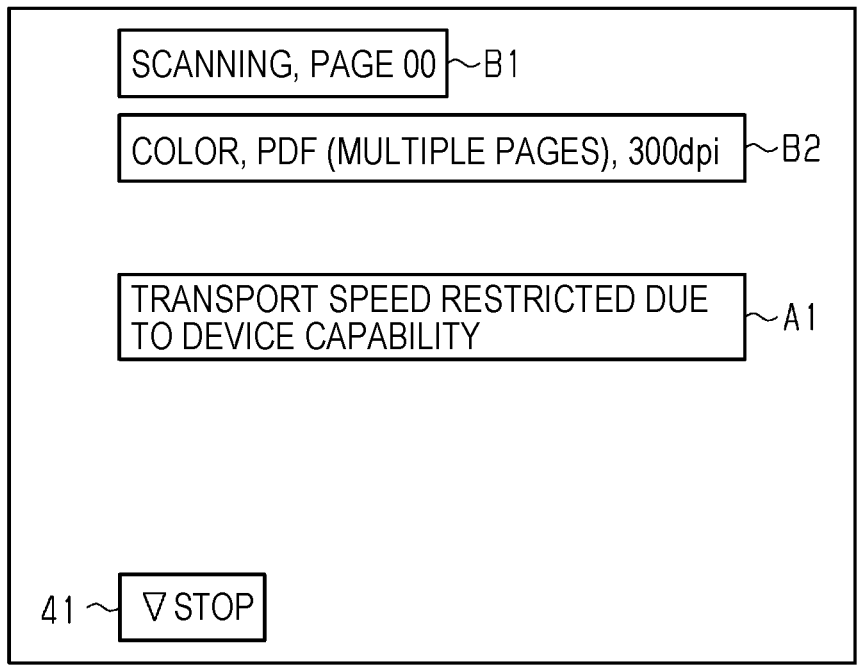
FIG. 16 is a schematic diagram showing a display screen when the transfer speed is less than S1 in the transfer by direct connection.

As illustrated in FIGS. 11, 12, 13, 14, 15, and 16, the notification section 38 notifies information by a message, for example. FIGS. 11, 12, 13, 14, 15, and 16 are examples of display screens displayed by the display section 16. The display section 16 displays, for example, a change notification A1, an improvement notification A2, and an error notification A3. The display screens shown in FIGS. 11, 12, 13, and 14 are displayed when the image data D1 is transferred to the external device 100 that is connected to the reading device 11 by wireless communication. The display screens shown in FIGS. 15 and 16 are displayed when the image data D1 is transferred to the external device 100 that is directly connected to the reading device 11.

The display section 16 may display not only the change notification A1, the improvement notification A2, and the error notification A3 but also other information. The display section 16 may display the read information B1. The read information B1 is information indicating the current reading status. The read information B1 indicates, for example, that the document 99 is being read. The read information B1 indicates, for example, which number page of the document 99 is currently being read.

The display section 16 may notify using the setting information B2. The setting information B2 is information indicating settings related to reading. The setting information B2 includes, for example, color related information such as color scale, monochrome scale, and gray scale. The setting information B2 includes, for example, information about a reading format such as PDF or TIFF. The setting information B2 includes, for example, information relating to resolutions by the reading section 23 such as 300 dpi and 600 dpi.

Figure 11:
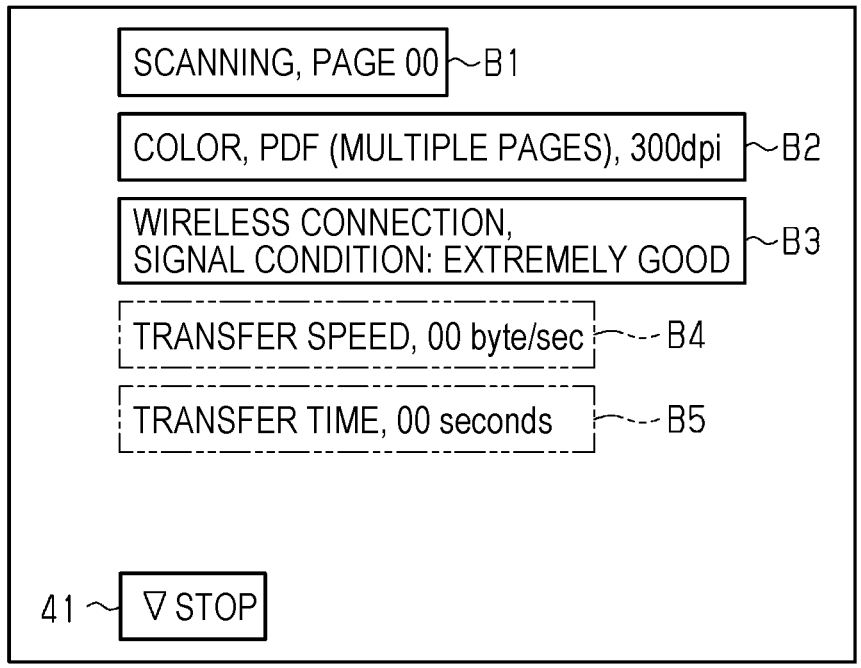
FIG. 11 is a schematic diagram showing a display screen for when the transfer speed is equal to or more than S1 in a transfer by wireless connection.

The display section 16 may display the communication speed information B3. The communication speed information B3 is information indicating a communication speed between the reading device 11 and the access point 101. The communication speed information B3 may indicate the amount of data per unit time by a numerical value, or may indicate the signal intensity in stages. The communication speed information B3 illustrated in FIG. 11 indicates that the communication speed is equal to or higher than R1. The communication speed information B3 illustrated in FIG. 11 is notified when the communication speed is equal to or higher than R1.

The display section 16 may display the transfer speed information B4. The transfer speed information B4 is information indicating a transfer speed. The transfer speed information B4 may indicate, for example, the amount of data per unit time as a numerical value, or may indicate the transfer speed in stages.

The display section 16 may display transfer time information B5. The transfer time information B5 is information indicating a transfer time for the document 99 currently being read.

The display section 16 may display a stop button 41. When the stop button 41 is operated via the operation section 17, the reading process is stopped. The display section 16 may display a restart button 42. The restart button 42 is displayed, for example, when the reading process is stopped. When the restart button 42 is operated via the operation section 17, the reading process is restarted. The restart button 42 allows the user to manually restart the reading process. The reading process may be automatically resumed.

Figure 12:
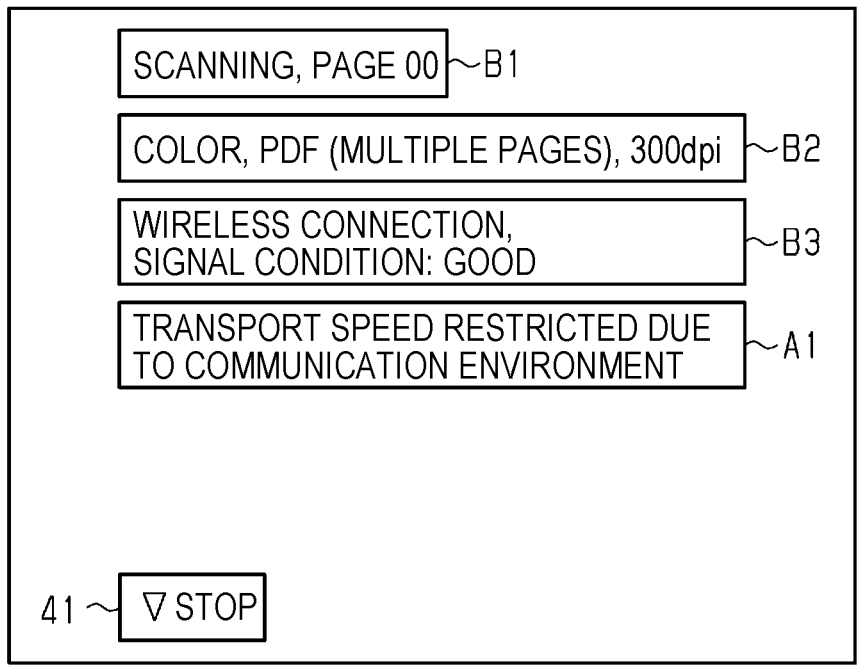
FIG. 12 is a schematic diagram showing a display screen for when the transfer speed is less than S1 and equal to or more than S2 in the transfer by wireless connection.

The display screen shown in FIG. 11 is displayed when the transfer speed is equal to or higher than S1. The display screen illustrated in FIG. 12 is displayed when the transfer speed is less than S1 and equal to or greater than S2. Therefore, in FIG. 12, the change notification A1 is notified. The display screen illustrated in FIG. 13 is displayed when the transfer speed is less than S2 and equal to or greater than S3. Therefore, in FIG. 13, the change notification A1 and the improvement notification A2 are notified. The display screen illustrated in FIG. 14 is displayed when the transfer speed is less than S3. Therefore, in FIG. 14, the change notification A1, the improvement notification A2, and the error notification A3 are notified.

The display screen shown in FIG. 15 is displayed when the transfer speed is equal to or higher than S1. The display screen shown in FIG. 16 is displayed when the transfer speed is less than S1. In FIGS. 15 and 16, since wireless communication is not used, the communication speed information B3 is not displayed. When wireless communication is not used, the transfer speed is determined by the capability of the external device 100 directly connected to the reading device 11, and thus the improvement notification A2 is not displayed. Further, in the case where the wireless communication is not used, the transfer speed does not become so low that the transfer of the image data D1 becomes difficult, and thus the error notification A3 is not displayed.

Flowchart

Next, an example of a reading process executed by the control section 39 will be described. For example, the reading process is started by the user inputting an instruction to start reading to the control section 39.

Figure 17:
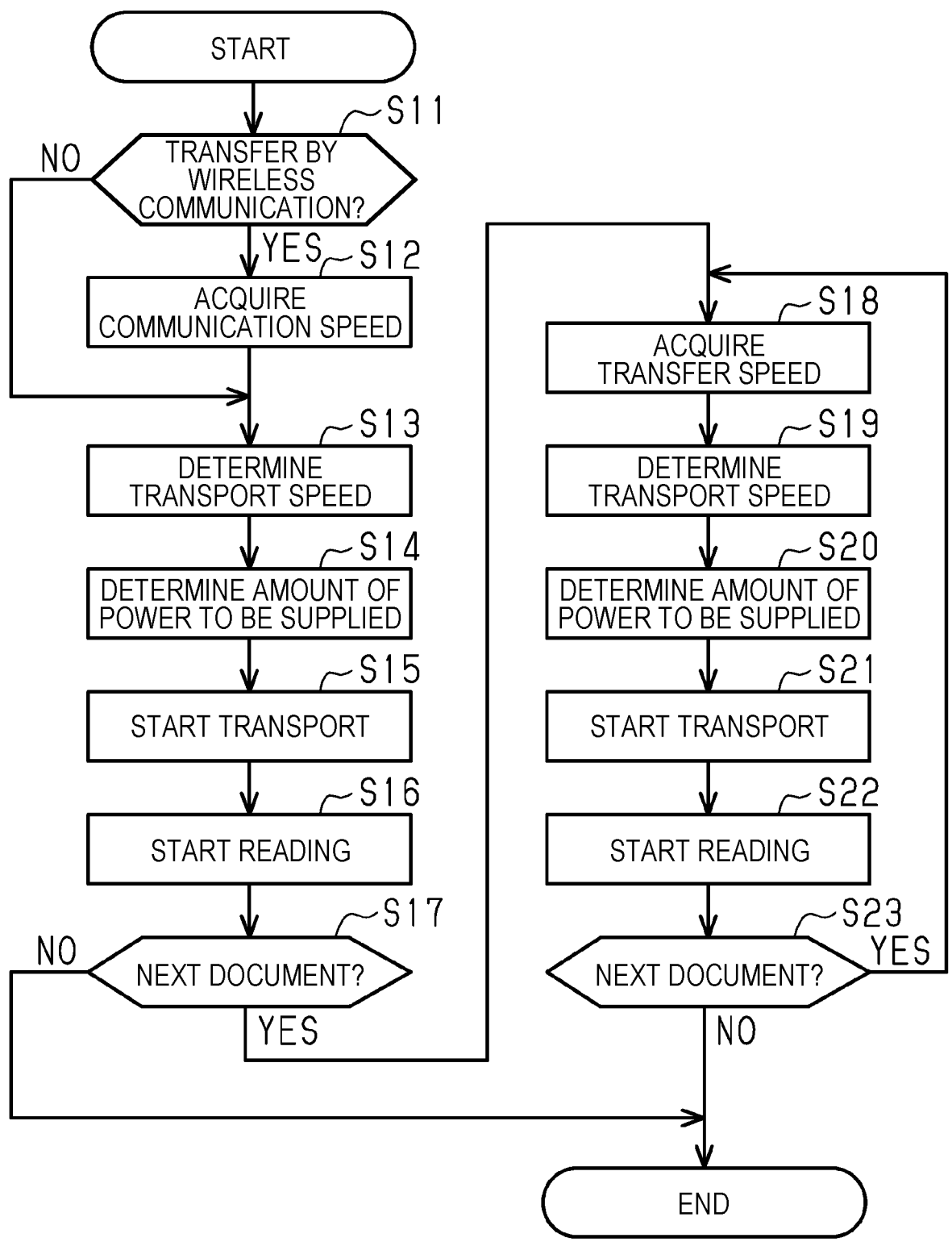
FIG. 17 is a flowchart illustrating an example of the reading process.

As shown in FIG. 17, in step S11, the control section 39 determines whether or not to transfer the image data D1 by wireless communication. When the image data D1 is transferred by wireless communication, the control section 39 shifts the process to step S12. When the image data D1 is not transferred by wireless communication, that is, when the image data D1 is transferred to the external device 100 directly connected to the reading device 11, the control section 39 shifts the process to step S13.

In step S12, the control section 39 acquires the communication speed.

In step S13, the control section 39 determines the transport speed. The control section 39 determines the transport speed based on the communication speed acquired in step S12. When the process of step S12 was not performed, the control section 39 determines the transport speed to be a normal speed, that is, V1. When the transport speed is determined to be V4, the control section 39 stops the reading processing at a predetermined timing.

In step S14, the control section 39 determines the amount of power to be supplied to the data generation section 25. The control section 39 determines the amount of power to be supplied to the data generation section 25 based on the communication speed acquired in step S12. If the process of step S12 was not performed, the control section 39 drives the data generation section 25 at a power supply amount of normal supply amount, that is, in the normal mode M1.

In step S15, the control section 39 starts to transport the document 99. The control section 39 transports the document 99 at the transport speed determined in step S13.

In step S16, the control section 39 starts reading of the document 99. The control section 39 drives the data generation section 25 with the amount of power supply determined in step S14.

In step S17, the control section 39 determines whether or not a subsequent document 99 is set on the supply tray 15. When a subsequent document 99 is set on the supply tray 15, that is, when plural sheets of document 99 are read in succession, the control section 39 shifts the process to step S18. When no subsequent document 99 is set on the supply tray 15, that is, in a case where only one sheet of document 99 is read, the reading process ends after reading of the current document 99 is ended.

In step S18, the control section 39 acquires the transfer speed. The control section 39 acquires the transfer speed of the image data D1 of the preceding document 99. The control section 39 acquires, for example, the transfer speed of the image data D1 from the document 99 that started to be read in step S16.

In step S19, the control section 39 determines the transport speed. The control section 39 determines the transport speed based on the transfer speed acquired in step S18. When the transport speed is determined to be V4, the control section 39 stops the reading processing at a predetermined timing.

In step S20, the control section 39 determines the amount of power to be supplied to the data generation section 25. The control section 39 determines the amount of power to be supplied to the data generation section 25 based on the transfer speed acquired in step S18.

In step S21, the control section 39 starts transport of the document 99. The control section 39 transports the document 99 at the transport speed determined in step S19.

In step S22, the control section 39 starts reading of the document 99. The control section 39 drives the data generation section 25 with the amount of power supply determined in step S20.

In step S23, the control section 39 determines whether or not a subsequent document 99 is set on the supply tray 15. When a subsequent document 99 is set on the supply tray 15, the control section 39 returns the process to step S18. When no subsequent document 99 is set on the supply tray 15, the control section 39 ends the reading process after finishing the reading of the current document 99.

Effects

Next, the effects of the above embodiment will be described.

(1) The control section 39 controls the transport speed based on the transfer speed, and, when the transport speed is changed, causes the notification section 38 to notify using a change notification A1 indicating a change in the transport speed.

According to the above-described configuration, it is possible to reduce a concern that the user misunderstands that the transport speed is changed due to a failure, a defect, or the like in the reading device 11. Therefore, the usability of the reading device 11 is improved.

(2) The display section 16 displays the transfer speed.

According to the above configuration, the user can grasp the transfer speed. By this, for example, when the transfer speed is low, the user can try to improve the transfer speed.

(3) The control section 39 estimates the transfer time based on the transfer speed. The display section 16 displays the transfer time.

According to the above configuration, the user can grasp the transfer time. This improves the convenience of the user.

(4) When the transfer speed is less than the improvement threshold value, the control section 39 causes the notification section 38 to notify using the improvement notification A2.

According to the above configuration, the user can recognize that the transfer speed is low by the improvement notification A2. This improves the convenience of the user.

(5) When the transfer speed is less than an error threshold value, which is smaller than the improvement threshold value, the control section 39 stops the transport section 19 and causes the notification section 38 to notify of an error.

When the transfer speed is extremely low, it may be difficult to transfer the image data D1. According to the above configuration, the user can recognize that the transfer speed is extremely low by notification of the error.

(6) When the transfer speed is less than the improvement threshold value, the control section 39 does not cause the notification section 38 to notify using the improvement notification A2 while the reading section 23 is reading the document 99.

By being notified of the improvement notification A2, the user may change the position, posture, and the like of the reading device 11. When the position, the posture, or the like of the reading device 11 is changed during the reading of the document 99, there is a concern that the reading quality may deteriorate. According to the above-described configuration, since the possibility that the position, the posture, and the like of the reading device 11 will be changed during reading of the document 99 is reduced, the possibility that the reading quality deteriorates is reduced.

(7) Based on the transfer speed, the control section 39 changes the transport speed during a period from the end of reading of the preceding document 99 to the start of transport of the subsequent document 99.

When the transport speed is changed while one sheet of the document 99 is being read, there is a concern that the reading quality may deteriorate. According to the above-described configuration, since the transport speed is not changed while one sheet of document 99 is being read, it is possible to reduce a concern that the reading quality will deteriorate.

(8) When plural sheets of document 99 are read in succession, the control section 39 controls the transport speed of the first sheet of document 99 based on the communication speed with the external device 100 that is connected by wireless communication. For the second and subsequent sheets of document 99, the control section 39 controls the transport speed based on the transfer speed. According to the above configuration, the transport speed is controlled for each document 99. That is, since the transport speed is optimized for each document 99, the waiting time of the user is reduced.

(9) The data generation section 25 generates the RGB image D2 from the read values of the reading section 23, and generates the image data D1 by performing conversion processing on the RGB image D2. The control section 39 controls the transport speed of the second and subsequent sheets of document 99 so that transfer of the image data D1 from the preceding sheet of document 99 is completed before generation of the image data D1 of the second and subsequent sheets of document 99 is started.

If the transfer of the previous image data D1 is not completed before the generation of the image data D1 is started, there is a concern that the image data D1 may accumulate. In this regard, according to the above-described configuration, since the subsequent image data D1 is generated after transfer of the image data D1 is completed, the possibility that the image data D1 will accumulate is reduced.

(10) The control section 39 restricts the function of the data generation section 25 based on the transfer speed.

When the function of the data generation section 25 is restricted, the generation speed of the image data D1 becomes low. However, in a situation in which the transfer speed is low, the time required for the transfer of the image data D1 does not change whether the data generation section 25 generates the image data D1 at a high speed or the data generation section 25 generates the image data D1 at a low speed. That is, the transfer speed becomes the bottleneck. For this reason, in a situation where the transfer speed is low, there will be no problem even if the function of the data generation section 25 is limited. By restricting the function of the data generation section 25, the power consumption of the data generation section 25 is reduced. Therefore, according to the above configuration, when the transfer speed is low, the power consumption of the data generation section 25 can be reduced.

(11) The control section 39 changes the transport speed based on the transfer speed and the amount of image data D1 stored in the storage section 33.

For example, when the storage amount of the image data D1 is large, the free space of the storage section 33 becomes small. In addition, when the transport speed of the document 99 is high, there is a concern that the free space of the storage section 33 may be further reduced. Even when the transfer speed is high, if the free space of the storage section 33 is small, it may be better to reduce the transport speed of the document 99. Therefore, according to the above configuration, it is possible to more suitably change the transport speed.

(12) When the transfer speed is less than a first threshold value, the control section 39 switches the data generation section 25 to a power saving mode.

When the function of the data generation section 25 is restricted, the generation speed of the image data D1 is reduced. However, in a situation in which the transfer speed is low, the time required for the transfer of the image data D1 does not change whether the data generation section 25 generates the image data D1 at a high speed or the data generation section 25 generates the image data D1 at a low speed. That is, the transfer speed becomes the bottleneck. Accordingly, in a situation where the transfer speed is low, there will be no problem even if the function of the data generation section 25 is limited. Therefore, according to the above configuration, when the transfer speed is less than the first threshold value, the amount of power is reduced by the power saving mode.

(13) When the transfer speed is less than a first threshold value, the control section 39 switches the data generation section 25 to the first power saving mode M2. When the transfer speed is less than the second threshold value, the control section 39 switches the operation mode to the second power saving mode M3 in which functions are further limited because the amount of power supplied to the data generation section 25 is smaller than compared to the first power saving mode M2. According to the above configuration, when the transfer speed is less than the second threshold value, the amount of power is further reduced by the second power saving mode M3.

(14) When the transfer speed is less than the third threshold value, the control section 39 causes the notification section 38 to notify of an error.

When the transfer speed is extremely low, it may be difficult to transfer the image data D1. According to the above configuration, the user can recognize that the transfer speed is extremely low by notification of the error.

(15) The control section 39 switches the data generation section 25 to a power saving mode by supplying power to only a part of the plurality of conversion modules 28.

According to the above configuration, since the number of conversion modules 28 to be driven is reduced in the power saving mode, the amount of electric power is reduced.

Modifications

The present embodiment can be modified as follows. The above embodiments and the following modifications can be implemented in combination with each other to the extent that there is no technical contradiction.

The control section 39 may predict the communication speed. The control section 39 may determine the transport speed for the first sheet of document 99 based on the predicted communication speed. The control section 39 may predict the communication speed based on the free space in the transfer buffer 35. For example, when the free space of the transfer buffer 35 is small, it can be predicted that the communication speed is low because the transfer of the image data D1 is being delayed.

The conversion module 28 may be configured to generate the image data D1 in a format other than JPEG images and TIFF images. For example, the conversion module 28 may generate the image data D1 in the format of BMP images, PNG images, or the like.

The control section 39 is not limited to changing the transport speed for each sheet, but, for example, may change it for each predetermined number of sheets. The control section 39 may switch the mode of the data generation section 25 for each predetermined number of sheets.

The notification section 38 may notify using at least one of the change notification A1 or the improvement notification A2. By this, it is possible to reduce a concern that the user misunderstands that the transport speed is changed due to a failure, a defect, or the like in the reading device 11.

Technical Ideas

Hereinafter, technical ideas grasped from the above embodiments and modifications, and operations and effects thereof, will be described.

First Aspect

A reading device connected to an external device includes a transport section configured to transport a document; a reading section configured to read the document transported by the transport section; a data generation section configured to generate image data of the document read by the reading section; a transfer section configured to transfer the image data to the external device; a notification section configured to notify information to a user; and a control section, wherein the control section is configured to control a transport speed of the document by the transport section based on a transfer speed of the image data by the transfer section and when the transport speed is changed, cause the notification section to notify using a change notification indicating a change in the transport speed.

According to the above-described configuration, it is possible to reduce a concern that the user misunderstands that the transport speed was changed due to a failure, a defect, or the like in the reading device. Therefore, the usability of the reading device is improved.

Second Aspect

The reading device of the first aspect may further include a display section configured to display the change notification, wherein the display section displays the transfer speed.

According to the above configuration, the user can grasp the transfer speed. By this, for example, when the transfer speed is low, the user can try to improve the transfer speed.

Third Aspect

The reading device according to the first or second aspect may further include a display section configured to display the change notification, wherein the control section estimates, based on the transfer speed, a transfer time required until transfer of the image data is completed and the display section displays the transfer time. According to the above configuration, the user can grasp the transfer time. This improves the convenience of the user.

Fourth Aspect

With respect to the reading device according to any one of the first to third aspects, the control section may, when the transfer speed is less than an improvement threshold value, cause the notification section to notify using an improvement notification prompting improvement of the transfer speed.

According to the above configuration, the user can recognize that the transfer speed is low by the improvement notification. This improves the convenience of the user.

Fifth Aspect

With respect to the reading device according to the fourth aspect, when the transfer speed is less than an error threshold value, which is smaller than the improvement threshold value, the control section may stop the transport section and cause the notification section to notify of an error.

If the transfer speed is extremely low, it may be difficult to transfer image data. According to the above configuration, the user can recognize that the transfer speed is extremely low by notification of the error.

Sixth Aspect

With respect to the reading device according to the fourth or fifth aspect, the control section may, when the transfer speed is less than an improvement threshold value, not cause the notification section to issue the improvement notification while the reading section is reading the document.

By being notified of the improvement notification, the user may change the position, posture, and the like of the reading device. When the position, the posture, or the like of the reading device is changed during the reading of the document, there is a concern that the reading quality may deteriorate. According to the above-described configuration, since the possibility that the position, the posture, and the like of the reading device will be changed during reading of the document is reduced, the possibility that the reading quality deteriorates is reduced.

Seventh Aspect

With respect to the reading device according to any one of the first to sixth aspects, the control section may change, based on the transfer speed, the transport speed during a period from completion of reading of a preceding document to start of transport of a subsequent document.

When the transport speed is changed while one sheet of the document is being read, there is a concern that the reading quality may deteriorate. According to the above-described configuration, since the transport speed is not changed while one sheet of document is being read, it is possible to reduce a concern that the reading quality will deteriorate.

Eighth Aspect

With respect to the reading device according to any one of the first to seventh aspects, when plural sheets of document are read in succession, the control section may control the transport speed for a first sheet of document based on a communication speed with the external device connected by wireless communication and may control the transport speed for a second and subsequent sheets of document based on the transfer speed of the image data transferred by the transfer section. According to the above configuration, the transport speed is controlled for each document. That is, since the transport speed is optimized for each document, the waiting time of the user is reduced.

Ninth Aspect

With respect to the reading device according to any one of the first to eighth aspects, the data generation section may generate an RGB image from read values of the reading section and generates image data by performing conversion processing on the RGB image and the control section may control the transport speed of the second sheet and the subsequent sheets of document such that the transfer of the image data of the preceding sheet of document is completed before starting generation of the image data of the second and subsequent sheets of document.

If transfer of the proceeding image data is not completed before generation of image data for a subsequent document is started, there is a concern that the image data may accumulate. In this regard, according to the above-described configuration, since the image data for the subsequent document is generated after transfer of the image data for the preceding document is completed, the possibility that the image data will accumulate is reduced.

Tenth Aspect

With respect to the reading device according to any one of first to ninth aspects, the control section may restrict a function of the data generation section based on the transfer speed.

When the function of the data generation section is restricted, the generation speed of the image data becomes low. However, in a situation in which the transfer speed is low, the time required for the transfer of the image data does not change whether the data generation section generates the image data at a high speed or the data generation section generates the image data at a low speed. That is, the transfer speed becomes the bottleneck. For this reason, in a situation where the transfer speed is low, there will be no problem even if the function of the data generation section is limited. By restricting the function of the data generation section, the power consumption of the data generation section is reduced. Therefore, according to the above configuration, when the transfer speed is low, the power consumption of the data generation section can be reduced.

Eleventh Aspect

The reading device according to any one of the first to tenth aspects may further include a storage section in which the image data is stored, wherein the control section changes the transport speed based on a storage amount of image data stored in the storage section and on the transfer speed.

For example, when the storage amount of the image data is large, the free space of the storage section becomes small. In addition, when the transport speed of the document is high, there is a concern that the free space of the storage section may be further reduced. Even when the transfer speed is high, if the free space of the storage section is small, it may be better to reduce the transport speed of the document. Therefore, according to the above configuration, it is possible to more suitably change the transport speed.

Twelfth Aspect

A reading device connected to an external device includes a transport section configured to transport a document; a reading section configured to read the document transported by the transport section; a data generation section configured to generate image data of the document read by the reading section; a transfer section configured to transfer the image data to the external device; a notification section configured to notify information to a user; and a control section, wherein the control section is configured to control a transport speed of the document by the transport section based on a transfer speed of the image data transferred by the transfer section and when the transfer speed is less than an improvement threshold value, cause the notification section to issue an improvement notification for prompting improvement of the transfer speed.

According to the above-described configuration, it is possible to reduce a concern that the user misunderstands that the transport speed was changed due to a failure, a defect, or the like in the reading device. That is, the user can recognize by the improvement notification that the transport speed of the document was changed due to the low transfer speed. Therefore, the usability of the reading device is improved.

Thirteenth Aspect

A method for controlling a reading device is a method for controlling a reading device that, by reading a transported document, generates image data of the document, the method including changing a transport speed of the document based on a transfer speed of the image data transferred from the reading device to an external device and notifying about a change in the transport speed when changing the transport speed. According to the above-described method, similar effects as those of the above-described reading device can be obtained.

Fourteenth Aspect

A reading device connected to an external device includes a transport section configured to transport a document; a reading section configured to read the document transported by the transport section; a data generation section configured to generate image data of the document read by the reading section; a transfer section configured to transfer the image data to the external device; and a control section that switches the data generation section between a plurality of modes, including a normal mode and a power saving mode, by controlling power supply to the data generation section. The power saving mode is a mode in which a function is restricted due to a smaller amount of power supplied to the data generation section compared to in the normal mode, and the control section controls a transport speed of the document by the transport section based on the transfer speed of the image data by the transfer section, and switches the data generation section to the power saving mode when the transfer speed is less than a threshold value.

When the function of the data generation section is restricted, the generation speed of the image data is reduced. However, in a situation in which the transfer speed is low, the time required for the transfer of the image data does not change whether the data generation section generates the image data at a high speed or the data generation section generates the image data at a low speed. That is, the transfer speed becomes the bottleneck. Accordingly, in a situation where the transfer speed is low, there will be no problem even if the function of the data generation section is restricted. Therefore, according to the above configuration, when the transfer speed is less than the threshold value, the amount of power is reduced by the power saving mode.

Fifteenth Aspect

The reading device according the fourteenth aspect may further include a storage section in which the image data is stored, wherein the control section changes the transport speed based on a storage amount of the image data stored in the storage section and on the transfer speed.

When the storage amount of the image data is large, the free space of the storage section becomes small. In addition, when the transport speed of the document is high, there is a concern that the free space of the storage section may be further reduced. In this way, even when the transfer speed is high, if the free space of the storage section is small, it may be better to reduce the transport speed of the document. Therefore, according to the above configuration, it is possible to more suitably change the transport speed.

Sixteenth Aspect

With respect to the reading device according to the fourteenth or the fifteenth aspect, the power saving mode may be a first power saving mode, the threshold value may be a first threshold value, the control section may switch the data generation section to the first power saving mode when the transfer speed is less than the first threshold value, and the control section may switch the data generation section to a second power saving mode, in which a function is further limited by a further decrease in power supply to the data generation section compared to in the first power saving mode, when the transfer speed is lower than a second threshold value, which is lower than the first threshold value. According to the above configuration, when the transfer speed is less than the second threshold value, the amount of power is further reduced by the second power saving mode.

Seventeenth Aspect

The reading device according to the sixteenth aspect may further include a notification section that notifies a user of information, wherein the control section causes the notification section to notify about an error when the transfer speed is less than a third threshold value, which is lower than the second threshold value.

If the transfer speed is extremely low, it may be difficult to transfer image data. According to the above configuration, the user can recognize that the transfer speed is extremely low by notification of the error.

Eighteenth Aspect

With respect to the reading device according to any one of the fourteenth to seventeenth aspects, the data generation section may include an RGB module that generates an RGB image from the read values of the reading section and a plurality of conversion modules that generate the image data by performing a conversion process on the RGB image, and the control section may switch the data generation section to the power saving mode by supplying power to only a portion of the plurality of conversion modules. According to the above configuration, since the number of conversion modules to be driven is reduced in the power saving mode, the amount of electric power is reduced.

Nineteenth Aspect

With respect to the reading device according to any one of the fourteenth to eighteenth aspects, when plural sheets of document are read in succession, the control section may control the transport speed for a first sheet of document based on a communication speed with the external device connected by wireless communication and may control the transport speed for a second and subsequent sheets of document based on the transfer speed of the image data transferred by the transfer section. According to the above configuration, the transport speed is controlled for each document. That is, since the transport speed is optimized for each document, the waiting time of the user is reduced.

Twentieth Aspect

With respect to the reading device according to any one of the fourteenth to nineteenth aspects, the data generation section may generate an RGB image from the read values of the reading section and may generate image data by performing conversion processing on the RGB image and the control section may control the transport speed of the second sheet and subsequent sheets of document such that transfer of the image data of the preceding sheet of document is completed before generation of the image data is started.

If transfer of the previous image data D1 is not completed before generation of the image data is started, there is a concern that the image data may accumulate. In this regard, according to the above-described configuration, since the subsequent image data is generated after transfer of the image data is completed, the possibility that the image data will accumulate is reduced.

Twenty First Aspect

A method for controlling a reading device is a method for controlling a reading device that includes a data generation section for generating image data of a transported document, the method including changing a transport speed of the document based on a transfer speed of the image data transferred from the reading device to an external device and, when the transfer speed is less than the threshold value, restricting a function of the data generation section by reducing amount of power supplied to the data generation section. According to the above-described method, the same effects as those of the above-described reading device can be obtained.

What is claimed is:

1. A reading device connected to an external device, the reading device comprising:
    a transport section configured to transport a document;
    a reading section configured to read the document transported by the transport section;
    a data generation section configured to generate image data of the document read by the reading section;
    a transfer section configured to transfer the image data to the external device;
    a notification section configured to notify information to a user; and
    a control section, wherein
    the control section is configured to
        control a transport speed of the document by the transport section based on a transfer speed of the image data by the transfer section and
        when the transport speed is changed, cause the notification section to notify using a change notification indicating a change in the transport speed, wherein
    when the transfer speed is less than an improvement threshold value, the control section causes the notification section to notify using an improvement notification prompting improvement of the transfer speed, and
    when the transfer speed is less than an error threshold value, which is smaller than the improvement threshold value, the control section stops the transport section and causes the notification section to notify of an error.

2. The reading device according to claim 1, further comprising:

a display section configured to display the change notification, wherein
the display section displays the transfer speed.

3. The reading device according to claim 1, further comprising:
a display section configured to display the change notification, wherein
the control section estimates, based on the transfer speed, a transfer time required until transfer of the image data is completed and
the display section displays the transfer time.

4. The reading device according to claim 1, wherein
when the transfer speed is less than the improvement threshold value, the control section does not cause the notification section to issue the improvement notification while the reading section is reading the document.

5. The reading device according to claim 1, wherein
the control section changes, based on the transfer speed, the transport speed during a period from completion of reading of a preceding document to start of transport of a subsequent document.

6. The reading device according to claim 1, wherein
when plural sheets of document are read in succession, the control section controls the transport speed for a first sheet of document based on a communication speed with the external device connected by wireless communication and controls the transport speed for a second and subsequent sheets of document based on the transfer speed of the image data transferred by the transfer section.

7. The reading device according to claim 6, wherein
the data generation section generates an RGB image from read values of the reading section and generates image data by performing conversion processing on the RGB image and
the control section controls the transport speed of the second sheet and the subsequent sheets of document such that the transfer of the image data of the preceding sheet of document is completed before starting generation of the image data of the second and subsequent sheets of document.

8. The reading device according to claim 1, wherein
the control section restricts a function of the data generation section based on the transfer speed.

9. The reading device according to claim 1, further comprising:
a storage section in which the image data is stored, wherein
the control section changes the transport speed based on a storage amount of the image data stored in the storage section and on the transfer speed.

10. A reading device connected to an external device, the reading device comprising:
a transport section configured to transport a document;
a reading section configured to read the document transported by the transport section;
a data generation section configured to generate image data of the document read by the reading section;
a transfer section configured to transfer the image data to the external device;
a notification section configured to notify information to a user; and
a control section, wherein
the control section is configured to
control a transport speed of the document by the transport section based on a transfer speed of the image data transferred by the transfer section and
when the transfer speed is less than an improvement threshold value, cause the notification section to issue an improvement notification for prompting improvement of the transfer speed,
wherein when the transfer speed is less than an error threshold value, which is smaller than the improvement threshold value, the control section stops the transport section and causes the notification section to notify of an error.

11. A method for controlling a reading device that, by reading a document that was transported, generates image data of the document, the method comprising:
changing a transport speed of the document based on a transfer speed of the image data transferred from the reading device to an external device; and
notifying about a change in the transport speed when changing the transport speed, wherein when the transfer speed is less than an improvement threshold value, an improvement notification is used to notify prompting improvement of the transfer speed, and when the transfer speed is less than an error threshold value, which is smaller than the improvement threshold value, the control section stops the transport section and causes the notification section to notify of an error.

* * * * *